(12) United States Patent
Gouda et al.

(10) Patent No.: US 10,125,284 B2
(45) Date of Patent: Nov. 13, 2018

(54) AQUEOUS INK, INK CARTRIDGE, AND INK JET RECORDING METHOD

(71) Applicant: CANON KABUSHIKI KAISHA, Tokyo (JP)

(72) Inventors: Keigo Gouda, Kawasaki (JP); Shin-ichi Hakamada, Kawasaki (JP); Hisao Kamo, Ushiku (JP); Hitoshi Nagashima, Chigasaki (JP); Daiji Okamura, Tokyo (JP); Takakazu Mizutani, Kawasaki (JP); Masahito Miyabe, Yokohama (JP); Isamu Oguri, Fukushima (JP); Kouichirou Okumura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/596,232

(22) Filed: May 16, 2017

(65) Prior Publication Data

US 2017/0335125 A1    Nov. 23, 2017

(30) Foreign Application Priority Data

May 20, 2016 (JP) .................................. 2016-101647
Apr. 24, 2017 (JP) .................................. 2017-085086

(51) Int. Cl.
*C09D 11/107* (2014.01)
*C09D 11/322* (2014.01)
(Continued)

(52) U.S. Cl.
CPC ........... *C09D 11/38* (2013.01); *B41J 2/17503* (2013.01); *C09D 11/037* (2013.01);
(Continued)

(58) Field of Classification Search
CPC ..... C09D 11/38; C09D 11/324; C09D 11/037; C09D 11/322; C09D 11/14; C09D 11/107; B41J 2/17503
See application file for complete search history.

(56) References Cited

U.S. PATENT DOCUMENTS 5,782,967 A    7/1998 Shirota et al.
6,036,307 A    3/2000 Hakamada et al.
(Continued)

FOREIGN PATENT DOCUMENTS

| EP | 0 571 190 A2 | 11/1993 |
|---|---|---|
| JP | H08-151544 A | 6/1996 |
| JP | H08-283637 A | 10/1996 |
| JP | 2011-213792 A | 10/2011 |
| WO | 01/42369 A2 | 6/2001 |

OTHER PUBLICATIONS

Bohlin, "Surface and porous structure of pigment coatings Interactions with flexographic ink and effects on print quality," Karlstad University (2013).*

(Continued)

*Primary Examiner* — Patrick King
(74) *Attorney, Agent, or Firm* — Fitzpatrick, Cella, Harper & Scinto

(57) ABSTRACT

An aqueous ink for ink jet, the aqueous ink including a pigment and a resin for dispersing the pigment. The pigment (Continued)

is impregnated with a compound having a structure in which at least two structures each represented by General Formula (1) are bonded by a glycoside bond.

(1)

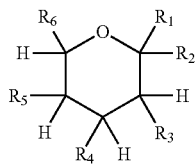

12 Claims, 2 Drawing Sheets

(51) Int. Cl.
*C09D 11/38* (2014.01)
*C09D 11/14* (2006.01)
*B41J 2/175* (2006.01)
*C09D 11/037* (2014.01)
*C09D 11/324* (2014.01)

(52) U.S. Cl.
CPC ............ *C09D 11/107* (2013.01); *C09D 11/14* (2013.01); *C09D 11/322* (2013.01); *C09D 11/324* (2013.01)

(56) References Cited

U.S. PATENT DOCUMENTS

| | | |
|---|---|---|
| 6,214,963 B1 | 4/2001 | Noguchi et al. |
| 6,398,355 B1 | 6/2002 | Shirota et al. |
| 6,474,803 B1 | 11/2002 | Shirota et al. |
| 6,552,156 B2 | 4/2003 | Noguchi et al. |
| 6,676,254 B2 | 1/2004 | Nagashima et al. |
| 6,698,876 B2 | 3/2004 | Sato et al. |
| 6,723,137 B1 | 4/2004 | Hakamada et al. |
| 6,848,781 B2 | 2/2005 | Ogino et al. |
| 6,929,362 B2 | 8/2005 | Takada et al. |
| 6,932,465 B2 | 8/2005 | Nito et al. |
| 6,935,732 B2 | 8/2005 | Takada et al. |
| 7,141,105 B2 | 11/2006 | Udagawa et al. |
| 7,144,449 B2 | 12/2006 | Udagawa et al. |
| 7,144,452 B2 | 12/2006 | Takayama et al. |
| 7,160,372 B2 | 1/2007 | Yoshizawa et al. |
| 7,185,978 B2 | 3/2007 | Nagashima et al. |
| 7,195,340 B2 | 3/2007 | Nagashima et al. |
| 7,198,664 B2 | 4/2007 | Mafune et al. |
| 7,198,665 B2 | 4/2007 | Nakamura et al. |
| 7,201,791 B2 | 4/2007 | Okamura et al. |
| 7,208,032 B2 | 4/2007 | Hakamada et al. |
| 7,247,194 B2 | 7/2007 | Okamura et al. |
| 7,247,196 B2 | 7/2007 | Sato et al. |
| 7,270,701 B2 | 9/2007 | Jinnou et al. |
| 7,276,112 B2 | 10/2007 | Tokuda et al. |
| 7,291,214 B2 | 11/2007 | Tsuji et al. |
| 7,291,361 B2 | 11/2007 | Ogino et al. |
| 7,297,197 B2 | 11/2007 | Jinnou et al. |
| 7,297,203 B2 | 11/2007 | Takada et al. |
| 7,354,145 B2 | 4/2008 | Nito et al. |
| 7,377,631 B2 | 5/2008 | Takada et al. |
| 7,381,257 B2 | 6/2008 | Takayama et al. |
| 7,402,200 B2 | 7/2008 | Imai et al. |
| 7,429,291 B2 | 9/2008 | Udagawa et al. |
| 7,464,965 B2 | 12/2008 | Udagawa et al. |
| 7,517,073 B2 | 4/2009 | Nito et al. |
| 7,517,074 B2 | 4/2009 | Hakamada et al. |
| 7,537,329 B2 | 5/2009 | Nito et al. |
| 7,553,358 B2 | 6/2009 | Okamura et al. |
| 7,566,362 B2 | 7/2009 | Mori et al. |
| 7,578,876 B2 | 8/2009 | Nakajima et al. |
| 7,601,210 B2 | 10/2009 | Fujioka et al. |
| 7,611,571 B2 | 11/2009 | Yamashita et al. |
| 7,618,484 B2 | 11/2009 | Fujimoto et al. |
| 7,625,614 B2 | 12/2009 | Kamo et al. |
| 7,635,182 B2 | 12/2009 | Hakamada et al. |
| 7,662,452 B2 | 2/2010 | Nagashima et al. |
| 7,682,433 B2 | 3/2010 | Yanagimachi et al. |
| 7,695,554 B2 | 4/2010 | Matsumoto et al. |
| 7,699,924 B2 | 4/2010 | Mafune et al. |
| 7,705,071 B2 | 4/2010 | Nakagawa et al. |
| 7,740,697 B2 | 6/2010 | Nagashima et al. |
| 7,806,970 B2 | 10/2010 | Fujioka et al. |
| 7,846,516 B2 | 12/2010 | Kamo et al. |
| 7,854,798 B2 | 12/2010 | Udagawa et al. |
| 7,867,586 B2 | 1/2011 | Kamo et al. |
| 7,883,199 B2 | 2/2011 | Hakamada et al. |
| 7,909,448 B2 | 3/2011 | Iwata et al. |
| 7,918,928 B2 | 4/2011 | Saito et al. |
| 7,947,762 B2 | 5/2011 | Udagawa et al. |
| 8,013,051 B2 | 9/2011 | Takada et al. |
| 8,016,406 B2 | 9/2011 | Hakamada et al. |
| 8,016,932 B2 | 9/2011 | Okamura et al. |
| 8,029,612 B2 | 10/2011 | Ishii et al. |
| 8,080,291 B2 | 12/2011 | Tanaka et al. |
| 8,123,846 B2 | 2/2012 | Yamakami et al. |
| 8,153,212 B2 | 4/2012 | Hyakuda et al. |
| 8,158,223 B2 | 4/2012 | Hyakuda et al. |
| 8,217,097 B2 | 7/2012 | Udagawa et al. |
| 8,236,394 B2 | 8/2012 | Tanaka et al. |
| 8,247,042 B2 | 8/2012 | Asakawa et al. |
| 8,247,043 B2 | 8/2012 | Tanaka et al. |
| 8,252,392 B2 | 8/2012 | Oguri et al. |
| 8,308,198 B2 | 11/2012 | Udagawa et al. |
| 8,324,293 B2 | 12/2012 | Imai et al. |
| 8,367,750 B2 | 2/2013 | Moribe et al. |
| 8,475,580 B2 | 7/2013 | Nagai et al. |
| 8,486,499 B2 | 7/2013 | Nito et al. |
| 8,524,336 B2 | 9/2013 | Oguri et al. |
| 8,545,008 B2 | 10/2013 | Asao et al. |
| 8,609,209 B2 | 12/2013 | Taguri et al. |
| 8,616,695 B2 | 12/2013 | Mori et al. |
| 8,741,984 B2 | 6/2014 | Moribe et al. |
| 8,795,798 B2 | 8/2014 | Oguri et al. |
| 8,846,166 B2 | 9/2014 | Herlambang et al. |
| 8,985,755 B2 | 3/2015 | Fujioka et al. |
| 8,987,348 B2 | 3/2015 | Mukae et al. |
| 9,090,789 B2 | 7/2015 | Hakamada et al. |
| 9,169,413 B2 | 10/2015 | Shiiba et al. |
| 9,302,525 B2 | 4/2016 | Oguri et al. |
| 9,388,322 B2 | 7/2016 | Kakikawa et al. |
| 9,452,608 B2 | 9/2016 | Okamura et al. |
| 9,593,250 B2 | 3/2017 | Mizutani et al. |
| 9,662,921 B2 | 5/2017 | Sugiura et al. |
| 9,725,608 B2 * | 8/2017 | Yatake ................ C09D 11/322 |
| 2003/0106462 A1 * | 6/2003 | Yatake ................ B41J 2/14201 106/31.59 |
| 2004/0020407 A1 * | 2/2004 | Kato ................... C09B 67/0013 106/31.6 |
| 2007/0097156 A1 | 5/2007 | Udagawa et al. |
| 2010/0098866 A1 | 4/2010 | Nagashima et al. |
| 2013/0027463 A1 | 1/2013 | Ogasawara et al. |
| 2014/0296393 A1 | 10/2014 | Valentini et al. |
| 2014/0307023 A1 | 10/2014 | Moribe et al. |
| 2015/0375553 A1 | 12/2015 | Yumoto et al. |
| 2016/0264800 A1 * | 9/2016 | Nishijima ................ B43K 8/02 |
| 2017/0335124 A1 * | 11/2017 | Hayashi ............... B41J 2/17503 |

OTHER PUBLICATIONS

Sep. 5, 2017 extended European Search Report in European Patent Appln. No. 17000845.2.

\* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

In recent years, an ink jet recording method has been used for recording of business documents using plain paper or the like as recording media, and has been used for such purposes with higher frequency. To record business documents and the like, it is important to record sharp images at high speed. On this account, the ink used for such a purpose is required to enable recording of ruled lines having excellent optical density and no distortion.

To solve such technical problems as above, an ink for ink jet recording containing an alginate is disclosed, for example, and the ink causes a viscosity increase after application onto a recording medium (Japanese Patent Application Laid-Open No. H08-283637). In order to improve ejection performance in the ink jet recording method, an ink containing a polysaccharide is disclosed (Japanese Patent Application Laid-Open No. H08-151544).

The inventors of the present invention have studied and found that the image recorded by using the ink disclosed in Japanese Patent Application Laid-Open No. H08-283637 has higher optical density. It is, however, also found that an ink containing a polysaccharide such as alginic acid causes various problems associated with an increase in viscosity of the ink. For example, it has been found that when the ejection of an ink is suspended for a certain time period and then the ink is ejected without recovery operation, the ink is ejected in a curved direction, or what is called "irregular ejection" is caused. It is also revealed that when a polysaccharide such as alginic acid is present in a free state in an ink, the polysaccharide may clog a filter in an ink supply line, and the ink is likely to be insufficiently supplied to a recording head. It is also found that the ink disclosed in Japanese Patent Application Laid-Open No. H08-151544 cannot suppress the irregular ejection. In other words, conventional inks are difficult to satisfy both the improvement in optical density of images and the suppression of irregular ejection.

SUMMARY OF THE INVENTION

In view of the above circumstances, an object of the present invention is to provide an aqueous ink enabling the recording of images having high optical density while the irregular ejection is suppressed. The present invention is also directed to provide an ink cartridge and an ink jet recording method using the aqueous ink.

The above objects are achieved by the following present invention. In other words, the present invention provides an aqueous ink for ink jet including a pigment and a resin for dispersing the pigment, where the pigment is impregnated with a compound having a structure in which at least two structures each represented by General Formula (1) are bonded by a glycoside bond.

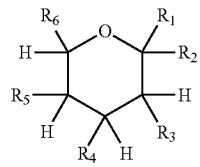

(In General Formula (1), each of $R_1$ to $R_6$ is independently a hydrogen atom, a methyl group, a phosphonic acid group, $-(CH_2)_x-OH$, $-(OCH(CH_3))_y-COOH$, $-NH(COCH_2)_z$, $-H$, $-OCOCH_2CH(OCOCH_2(OH)C_{11}H_{22}CH_3)C_{10}H_{20}CH_3$, or $-NHCOCH_2CH(OC_{11}H_{22}CH_3)C_{10}H_{20}CH_3$, and at least one of $R_1$ and $R_2$ is a hydroxy group; and each of x, y, and z is independently a number from 0 or more to 6 or less.)

According to the present invention, an aqueous ink enabling the recording of images having high optical density while the irregular ejection is suppressed can be provided. According to the present invention, an ink cartridge and an ink jet recording method using the aqueous ink can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
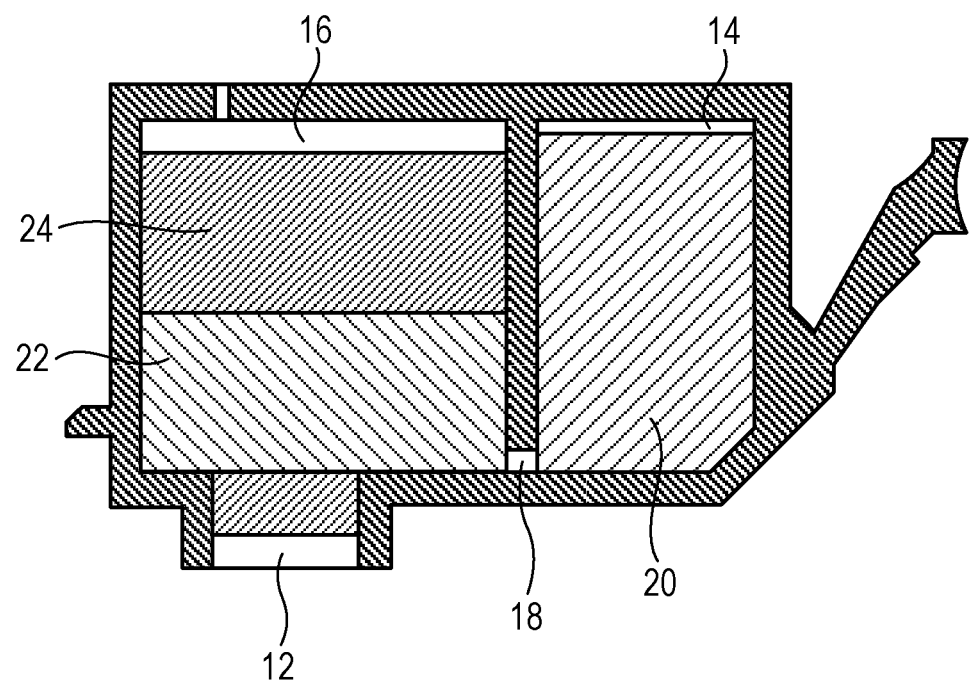
FIG. 1 is a schematic sectional view illustrating an exemplary ink cartridge of the present invention.

Preferred embodiments of the present invention will now be described in detail in accordance with the accompanying drawings.

The present invention will now be described in detail with reference to preferred embodiments. In the present invention, if a compound is a salt, the salt dissociates into ions in an ink, but such an ink is expressed as "containing a salt" for convenience. An aqueous ink for ink jet is also simply referred to as "ink". The "unit" relating to resins is a minimum repeating unit constituting a resin, and means a structure formed by (co)polymerization of a single type of monomer. Physical property values are values determined at normal temperature (25° C.) unless otherwise noted.

An ink of the present invention is specifically characterized by containing a pigment that is impregnated with a compound having a structure in which at least two structures each represented by General Formula (1) are bonded by a glycoside bond (hereinafter also referred to as "polysaccharide compound"). In the present specification, "pigment being impregnated with a compound" means that a plurality of primary particles of a pigment assemble to form secondary particles (pigment aggregate) having pores therein in which pores a compound is present. Hence, compounds adhering to the surface of pigment particles present in an ink are not included in the concept of the "compound with which a pigment is impregnated", regardless of whether the pigment is present as primary particles or secondary particles in an ink. Hereinafter, compounds other than "compound with which a pigment is impregnated" may also be expressed as "compound present in a free state".

The inventors of the present invention have found that an image recorded by using an ink containing a pigment and a polysaccharide compound such as sodium alginate has higher optical density. However, it has been found that when the ejection of the ink is suspended for about 2 seconds and then ruled lines are recorded without recovery operation, the ruled lines are distorted due to irregular ejection. This is thought to be due to the following mechanism: The addition of a polysaccharide compound and the evaporation of a liquid component from an ejection orifice cause rapid increase in viscosity of the ink, and the ink is unlikely to be normally ejected and is ejected in a curved direction. Hence, it is difficult to allow the ink to adhere to an intended position on a recording medium.

The inventors of the present invention have studied an ink capable of increasing optical density while the irregular ejection is suppressed. The result has indicated that the above problem can be solved by using a polysaccharide compound with which a pigment is impregnated but which is not present in a free state in the ink. The polysaccharide compound present in a free state in the ink has high degree of steric freedom and thus is likely to increase the viscosity of the ink. In contrast, the polysaccharide compound with which a pigment is impregnated does not have high degree of steric freedom in the ink. When a liquid component starts to evaporate from an ejection orifice, the polysaccharide compound with which a pigment is impregnated is likely to diffuse as the liquid component moves, but the polysaccharide compound is unlikely to be eluted from the pigment. Hence, the viscosity of the ink is not rapidly increased, and the irregular ejection is thought to be suppressed. In an ink in which a pigment is not impregnated with a polysaccharide compound but the polysaccharide compound is present in a free state in the ink, the polysaccharide compound is not considered to be incorporated into pores in secondary particles of the pigment. This is thought to be due to steric hindrance or the like of the polysaccharide compound.

When the ink is applied to a recording medium, a much larger amount of a liquid component evaporates than that from an ejection orifice, and thus a polysaccharide compound is likely to diffuse. The polysaccharide compound has affinity with components having hydrogen bond formability, such as cellulose constituting a recording medium, and thus is eluted from a pigment when the ink is applied to a recording medium and a liquid component is reduced. Accordingly, the polysaccharide compound is present in a free state, and the viscosity of the ink is rapidly increased. Hence, the pigment is prevented from sinking into a recording medium, and a resulting image is thought to have higher optical density.

In other words, it is important in the present invention that the polysaccharide compound with which a pigment is impregnated in an ink is eluted from the pigment after the application of the ink to a recording medium, and the viscosity of the ink is rapidly increased by the polysaccharide compound to suppress the sinking of the pigment.

Aqueous Ink

The ink of the present invention is an aqueous ink for ink jet containing a pigment and a resin for dispersing the pigment (resin dispersant). The pigment is impregnated with a compound having a structure in which at least two structures each represented by General Formula (1) are bonded by a glycoside bond (polysaccharide compound). Hereinafter, components constituting the ink of the present invention, physical properties of the ink, and the like will be described in detail.

Polysaccharide Compound

The pigment contained in the ink of the present invention is impregnated with what is referred to as a polysaccharide compound having a structure in which at least two structures each represented by General Formula (1) are bonded by a glycoside bond. This polysaccharide compound preferably has a structure in which at least two structures each represented by General Formula (1) are condensed between hydroxy groups of the at least two structures. The condensation between hydroxy groups is preferably a dehydration condensation.

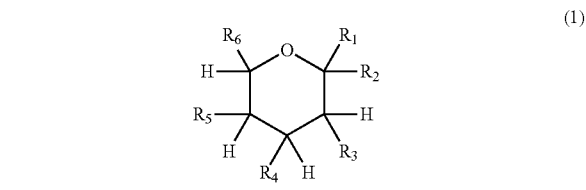

(1)

(In General Formula (1), each of $R_1$ to $R_6$ is independently a hydrogen atom, a methyl group, a phosphonic acid group, —$(CH_2)_x$—OH, —$(OCH(CH_3))_y$—COOH, —NH$(COCH_2)_z$—H, —OCOCH$_2$CH(OCOCH$_2$(OH)C$_{11}$H$_{22}$CH$_3$)C$_{10}$H$_{20}$CH$_3$, or —NHCOCH$_2$CH(OC$_{11}$H$_{22}$CH$_3$)C$_{10}$H$_{20}$CH$_3$, and at least one of $R_1$ and $R_2$ is a hydroxy group; and each of x, y, and z is independently a number from 0 or more to 6 or less.)

Each of x, y, and z is independently a number from 0 or more to 6 or less. The group represented by —$(CH_2)_x$—OH is preferably —OH (hydroxy group), —$CH_2$—OH, —$(CH_2)_2$—OH, —$(CH_2)_3$—OH, and the like, and is more preferably —OH (hydroxy group), —$CH_2$—OH, and the like. The group represented by —$(OCH(CH_3))_y$—COOH is preferably —OCH(CH$_3$)—COOH, and the like. The group represented by —NH$(COCH_2)_z$—H is preferably —NHCOCH$_3$, for example.

The structure represented by General Formula (1) is preferably exemplified by structures a to k shown in Table 1. The relations between the structures represented by General Formula (1) and polysaccharide compounds are shown in Table 2. For example, "xanthan gum" in Table 2 is a compound having the structure in which structures derived from glucose, mannose, and glucuronic acid are bonded by a glycoside bonds between hydroxy groups of the respective structures. Needless to say, the present invention is not limited to the exemplified structures and the polysaccharide compounds shown below and includes any structures and any compounds having the structure of General Formula (1) and satisfying the definition of the compound.

TABLE 1

Structure examples represented by General Formula (1)

| Structure | Combination of $R_1$ and $R_2$ | | $R_3$ | $R_4$ | $R_5$ | $R_6$ |
|---|---|---|---|---|---|---|
| a | Hydrogen atom | Hydroxy group | Hydroxy group | Hydroxy group | Hydroxy group | Methyl group |
| b | Hydrogen atom | Hydroxy group | Hydroxy group | Hydroxy group | Hydroxy group | $CH_2OH$ |
| c | Hydrogen atom | Hydroxy group | Hydroxy group | Hydroxy group | Hydroxy group | Carboxylic acid group |
| d | Hydrogen atom | Hydroxy group | Hydroxy group | Hydroxy group | Hydroxy group | Hydrogen atom |
| e | Hydrogen atom | Hydroxy group | Amino group | Hydroxy group | Hydroxy group | $CH_2OH$ |
| f | Hydrogen atom | Hydroxy group | $NHCOCH_3$ | Hydroxy group | Hydroxy group | $CH_2OH$ |
| g | Hydrogen atom | Hydroxy group | Hydrogen atom | Hydroxy group | Amino group | $OCH(CH_3)COOH$ |
| h | Hydrogen atom | Hydroxy group | Hydrogen atom | Hydroxy group | $NHCOCH_3$ | $OCH(CH_3)COOH$ |
| i | Hydrogen atom | Hydroxy group | Amino group | $OCH(CH_3)COOH$ | Hydroxy group | $CH_2OH$ |
| j | Hydrogen atom | Hydroxy group | $NHCOCH_3$ | $OCH(CH_3)COOH$ | Hydroxy group | $CH_2OH$ |
| k | Hydrogen atom | Hydroxy group | (*1) | (*2) | Phosphonic acid group | $CH_2OH$ |

(*1) $NHCOCH_2CH(OC_{11}H_{22}CH_3)C_{10}H_{20}CH_3$
(*2) $OCOCH_2CH(OCOCH_2(OH)C_{11}H_{22}CH_3)C_{10}H_{20}CH_3$

TABLE 2

Relation between structure represented by General Formula (1) and polysaccharide compound

| | | | Polysaccharide compound | | | | | | | | |
|---|---|---|---|---|---|---|---|---|---|---|---|
| | | | Dextran | Arabinoxylan | Xanthan gum | Guar gum | Hyaluronic acid | Gellan gum | Ganglioside (GQ1b) | Peptidoglycan | Lipopolysaccharide |
| Structure | a | Rhamnose | | | | | | ○ | | | |
| | b | Glucose | ○ | | ○ | | | ○ | | | |
| | | Galactose | | | | ○ | | | ○ | | |
| | | Mannose | | | ○ | ○ | | | | | |
| | c | Glucuronic acid | | | ○ | | ○ | ○ | | | |
| | d | Xylose | | ○ | | | | | | | |
| | e | Glucosamine | | | | | | ○ | | | |
| | f | N-acetylglucosamine | | | | | | | | ○ | ○ |
| | | N-acetylgalactosamine | | | | | | | ○ | | |
| | g | Neuraminic acid | | | | | | | | | |
| | h | N-acetylneuraminic acid | | | | | | | ○ | | |
| | i | Muramic acid | | | | | | | | | |
| | j | N-acetylmuramic acid | | | | | | | | ○ | ○ |
| | k | Lipid A | | | | | | | | | ○ |

The polysaccharide compound can be synthesized by, for example, polymerization through glycosylation reaction of two or more compounds having the structure represented by General Formula (1). The glycosylation reaction is exemplified by glycosylation reaction in terms of organic chemistry and glycosylation reaction using a glycosyltransferase.

As the compound having the structure represented by General Formula (1) (monosaccharide), at least one compound selected from the group consisting of rhamnose, glucose, galactose, mannose, glucuronic acid, xylose, glucosamine, N-acetylglucosamine, N-acetylgalactosamine, neuraminic acid, N-acetylneuraminic acid, muramic acid, N-acetylmuramic acid, and lipid A is preferably used. As the polysaccharide compound, at least one polysaccharide compound selected from the group consisting of dextran, arabinoxylan, xanthan gum, guar gum, hyaluronic acid, gellan gum, ganglioside, peptidoglycan, and lipopolysaccharide is preferably used.

The polysaccharide compound preferably has a carboxylic acid group. When a polysaccharide compound having a carboxylic acid group is used, the carboxylic acid group comes into contact with and reacts with a filler contained in a recording medium or with a cation contained as a constitution component in an ink receiving layer of a recording medium, and then the polysaccharide compound gelates. On this account, the optical density of an image can be further improved.

The amount of the polysaccharide compound with which the pigment is impregnated is preferably 1 ppm or more to 4,500 ppm or less in terms of mass ratio to the amount of the pigment. When the mass ratio is less than 1 ppm, a smaller amount of the polysaccharide compound is eluted from the pigment after the application of an ink to a recording medium. Hence, a resulting image may have insufficient optical density. When the mass ratio is more than 4,500 ppm, the polysaccharide compound is likely to be eluted from the pigment in an ink stored for a long time. Hence, the irregular ejection may not be sufficiently suppressed.

The content (ppm) of the polysaccharide compound with which the pigment is impregnated is preferably 90% or more in terms of mass ratio to the total content (ppm) of the polysaccharide compound in an ink. The total content (ppm) of a polysaccharide compound in an ink means the sum of the amount of the polysaccharide compound with which a pigment is impregnated and the amount of the polysaccharide compound present in a free state in the ink. In other words, it is preferred that with almost all the polysaccharide compound the pigment is impregnated, but the polysaccharide compound not being present in the ink in a free state. When the mass ratio is less than 90%, an excess amount of the polysaccharide compound is present in a free state, and the irregular ejection may not be sufficiently suppressed. The mass ratio is preferably 100% or less.

The content (ppm) of the polysaccharide compound present in a free state in an ink is preferably 25 ppm or less based on the total mass of the ink. When the content of the polysaccharide compound present in a free state is more than 25 ppm, the ink viscosity increases upon evaporation of a liquid component, resulting in insufficient ejection stability in some cases. The lower limit of the content of the polysaccharide compound present in a free state can be 0 ppm.

The polysaccharide compound preferably has a weight-average molecular weight of 20,000 or more to 2,200,000 or less and more preferably 20,000 or more to 2,000,000 or less. The weight-average molecular weight of a polysaccharide compound is a value determined by gel permeation chromatography (GPC) in terms of polystyrene. When a polysaccharide compound has a weight-average molecular weight of less than 20,000, the viscosity of an ink is not so increased even when the polysaccharide compound is eluted from a pigment, and the optical density of an image may not be sufficiently improved. When a polysaccharide compound has a weight-average molecular weight of more than 2,200,000, the polysaccharide compound is eluted from a pigment at a lower rate. On this account, the pigment is likely to sink into a recording medium before the ink viscosity increases, and the optical density of an image may not be sufficiently improved. When the weight-average molecular weight of a polysaccharide compound is more than 2,200,000 and the content of a polysaccharide compound present in a free state in an ink is more than 25 ppm, the polysaccharide compound is likely to adhere to a filter in an ink supply line. Hence, the ink supply performance to a recording head is likely to deteriorate in some cases. The weight-average molecular weight of a polysaccharide compound may be adjusted by a chemical treatment including hydrolysis or a physical treatment including sonication.

Analysis of Polysaccharide Compound

The analytical method of a polysaccharide compound in an ink will be described with reference to examples. Whether a pigment is impregnated with a polysaccharide compound can be determined by, for example, phenol-sulfuric acid method, kinetic colorimetric assay (toxinometer method: correlation of color change by reaction with a particular substance), and HPLC using a column for sugar analysis. The analytical method using a toxinometer (toxinometer method), which is a simple method, will next be described. The toxinometer method is an endotoxin measurement method capable of generally detecting compounds including metabolites of fungi, such as polysaccharides, at high sensitivity.

First, a liquid A containing an appropriate amount of a pigment is prepared. Then, a toxinometer is used to determine the total amount a of a polysaccharide compound present in the liquid A. Next, the polysaccharide compound present in a free state in the liquid A is removed. Specifically, the liquid A is subjected to ultrafiltration through a hollow fiber membrane having a cutoff molecular weight of about 100 kDa and is separated into a liquid B containing the pigment and a filtrate. The presence or absence of the polysaccharide compound in the filtrate is analyzed by phenol-sulfuric acid method, and when a filtrate is discolored, ultrafiltration is repeated until the filtrate is not discolored. Then, a toxinometer is used to determine the total amount b of the polysaccharide compound present in the liquid B. The amount of the polysaccharide compound with which the pigment is impregnated corresponds to "b". The amount of the polysaccharide compound present in a free state in the liquid A corresponds to "a-b". For example, when the value "a" is more than 0 and the value "b" is 0, a pigment is not impregnated with a polysaccharide compound but the polysaccharide compound is present in a free state in the liquid A.

A polysaccharide compound can be identified by liquid chromatography, for example. To identify the polysaccharide compound with which a pigment is impregnated, the pH of a liquid containing the pigment is first adjusted to about 12.0, which is strong alkaline. The liquid is then heated to about 80° C. and is maintained for about 2 hours. By this operation, the polysaccharide compound can be eluted from the pigment. Next, the liquid is subjected to ultrafiltration to give a filtrate containing the polysaccharide compound, then the filtrate is analyzed by liquid chromatography or the like, and the polysaccharide compound with which the pigment is impregnated can be identified. The pH of a liquid containing a pigment can be adjusted by using an aqueous solution of an alkali metal hydroxide such as potassium hydroxide. The ultrafiltration can be performed by using a hollow fiber membrane having a cutoff molecular weight of about 70 kDa.

Method of Impregnating Pigment with Polysaccharide Compound

For example, the following step (i) can be performed to impregnate a pigment with a polysaccharide compound. When a pigment is impregnated with an excess amount of a polysaccharide compound after the step (i), the following steps (ii) to (v) can be further performed to control the amount of the polysaccharide compound with which the pigment is impregnated. When an excess amount of a polysaccharide compound is present in a free state after the step (i), at least one of the following steps (iii) to (v) can be further performed to remove the polysaccharide compound present in a free state. As needed, some of the steps (iii) to (v) can be performed, and the order of steps can be appropriately changed. After the final step, a purification step may be further performed. Each of the steps (i) to (v) will next be described.

Step (i): A pigment is impregnated with a polysaccharide compound.

Step (ii): The polysaccharide compound is released from the pigment.

Step (iii): Of the components derived from the polysaccharide compound released from the pigment, components having a smaller size than that of the pigment are removed.

Step (iv): Of the components derived from the polysaccharide compound released from the pigment, components having a larger size than that of the pigment are removed.

Step (v): The alkali component or the acid component used in step (ii) is removed.

Step (i)

To impregnate a pigment with a polysaccharide compound, the polysaccharide compound itself can be used, or a fungus (including Gram-positive bacteria and Gram-negative bacteria) that produces the polysaccharide compound through metabolism can also be used. For example, a crude pigment is kneaded with a component containing at least one of a polysaccharide compound and a fungus capable of producing a polysaccharide compound, and then the mixture is pulverized. Such a step can be performed by a common process for pulverizing a crude pigment. As needed, the mixture can be maintained in conditions for cultivating fungi, and thus the pigment can be impregnated with the polysaccharide compound.

A crude pigment, a polysaccharide compound or a fungus, and a liquid medium (for example, water, an organic solvent, or a mixed medium thereof) are kneaded to give a kneaded mixture. The resulting kneaded mixture has almost no flowability. Raw materials are preferably kneaded in such conditions as to give a kneaded mixture having a solid content of about 80% by mass or more. When a kneaded mixture has a high solid content, the kneaded mixture keeps an appropriately high viscosity during kneading, and thus a high shear stress is applied to the kneaded mixture. This condition enables efficient pulverization of the crude pigment and efficient impregnation of the pigment with the polysaccharide compound. When a kneaded mixture has a solid content of less than 80% by mass, the kneaded mixture has a low viscosity, and thus the pulverization degree of the pigment may be slightly insufficient. In addition, the pigment may not be highly efficiently impregnated with the polysaccharide compound. In order to stably maintain a high viscosity of a kneaded mixture, a closed type kneader such as a twin-screw kneading extruder is preferably used.

When a polysaccharide compound itself is used, the polysaccharide compound can be previously treated into an amorphous state. The amorphous compound is easily dissolved in a liquid medium and thus a pigment can be more efficiently impregnated therewith. When a fungus is used, a kneaded mixture is preferably maintained in the conditions for cultivating the fungus to impregnate the pigment with a polysaccharide compound to be the metabolite. In this case, a kneaded mixture can be maintained in a cultivation condition, or a kneaded mixture can be treated into a wet state, for example, as a wet cake and then can be maintained in a cultivation condition. During the maintenance, the temperature is preferably 15 to 40° C., the relative humidity is preferably 20 to 30%, and the maintenance time is preferably 1 to 3 months. When a fungus is used, the fungus after the production of a polysaccharide compound becomes unnecessary and thus is preferably inactivated. The process for inactivation of a fungus is exemplified by heat treatment; ozone treatment; and treatment with an antifungal agent such as benzisothiazolin-3-one, isocyanuric acid, and imazalil. After the step (i), a typical dispersion treatment for dispersing a pigment can be performed. The steps (ii) to (v) can be performed regardless of whether the dispersion treatment is performed. When at least one of the steps (ii) to (v) is performed, a typical dispersion treatment for dispersing a pigment can be performed subsequent to the steps.

Step (ii)

The step (ii) is a step of releasing the polysaccharide compound from the pigment. The step (ii) is performed when a pigment is impregnated with an excess amount of a polysaccharide compound or an excess amount of a polysaccharide compound is present in a free state. In the step (ii), the polysaccharide compound is released from the pigment, and concurrently the released polysaccharide compound is modified or hydrolyzed to facilitate the step (iii) or the step (iv). The polysaccharide compound can be modified or hydrolyzed by alkali treatment or acid treatment. A typical polysaccharide compound is present while maintaining a hairpin loop structure. A polysaccharide compound that has been modified to lose the hairpin loop structure turns into low molecular compounds having a smaller volume or turns into a gel having a larger volume. A polysaccharide compound is hydrolyzed into low molecular compounds having a smaller volume. By using the difference in size between a pigment and components generated by modification or hydrolysis of a polysaccharide compound, the step (iii) or the step (iv) is performed to remove such components.

To subject a polysaccharide compound to an alkali treatment, a liquid containing an alkali component can be added to and mixed with a liquid containing a pigment, for example. In order to improve the efficiency of the modification or the hydrolysis of a polysaccharide compound, the pH of the liquid after mixing is preferably increased as much as possible. Specifically, the liquid after mixing preferably has a pH of 10.0 or more and more preferably 12.0 or more. The liquid after mixing preferably has a pH of 13.5 or less. In order to accelerate the modification or the hydrolysis of the polysaccharide compound, the liquid after mixing is next heated. The temperature is preferably 60° C. or more and more preferably 80° C. or more. The temperature is preferably 100° C. or less.

The polysaccharide compound has a pKa of about 12.0 to 13.0. Hence, when a liquid prepared by adding and mixing a liquid containing an alkali component has a pH of 12.0, about half of the polysaccharide compound dissociates. For example, the pKa of a liquid heated at 80° C. or more is lowered, and thus substantially the whole polysaccharide compound dissociates. By maintaining the liquid in this condition for a certain time, substantially the whole polysaccharide compound present in a free state can be modified or hydrolyzed. When the liquid is maintained in the above conditions for a longer time, the polysaccharide compound with which the pigment is impregnated can be released and modified or hydrolyzed.

To subject a polysaccharide compound to an acid treatment, a liquid containing an acid component can be added to and mixed with a liquid containing a pigment, for example. In order to improve the efficiency of the modification or the hydrolysis of a polysaccharide compound, the pH of the liquid after mixing is preferably reduced as much as possible. Specifically, the liquid after mixing preferably has a pH of 6.0 or less and more preferably 4.0 or less. The liquid after mixing preferably has a pH of 2.0 or more. In order to accelerate the modification or the hydrolysis of the polysaccharide compound, the liquid after mixing is next heated. The temperature is preferably 40° C. or more and more preferably 60° C. or more. The temperature is preferably 100° C. or less.

In the case of the acid treatment, the hydrolysis is markedly accelerated by heating, and thus the heating temperature can be set at a lower temperature than that for the alkali treatment. However, a typical resin used as the dispersant of a pigment has an anionic group, and thus may be hydrolyzed by the acid treatment or precipitated by an acid, for example. Hence, the acid treatment is preferably, carefully performed. The heating time for the alkali treatment or the acid treatment can be appropriately set depending on the amount of a pigment used or the type of a stirrer, for example. The heating is preferably performed for a time sufficient for the treatment of a pigment. Specifically, the heating time is preferably 5 to 240 minutes.

Examples of the alkali component include hydroxides of alkali metals such as lithium, sodium, and potassium; and hydroxides of alkaline earth metals such as strontium and barium. Examples of the acid component include inorganic acids such as hydrochloric acid, sulfuric acid, and nitric acid; and organic acids such as phthalic acid and methanesulfonic acid. An aqueous solution prepared by dissolving such an alkali component or an acid component in water can be used. The content (% by mass) of an alkali component or an acid component in an aqueous solution can be such a content as to give an intended pH, and is preferably 0.1% by mass or more to 3.0% by mass or less based on the total mass of an aqueous solution. The mixing ratio of a pigment and an aqueous solution can be such a ratio that the pigment be sufficiently immersed in the aqueous solution, and is preferably pigment:aqueous solution=1:1 to 1:10 in terms of mass ratio, for example.

Step (iii)

In the step (iii), of the components derived from the polysaccharide compound released in the step (ii), components having a smaller size than that of the pigment are removed from a liquid containing the pigment. Specifically, of the components derived from the polysaccharide compound, components having a smaller size than that of the pigment can be removed by ultrafiltration, filter pressing, disk filtering, centrifugation, or the like. For example, when the polysaccharide compound is treated so as to become components having a size of about 30 nm or less in the step (ii), a separation membrane having a pore size of 50 nm or less or a separation membrane having a cutoff molecular weight of 500 kDa or less, preferably 100 kDa or less, can be used. In order to prevent a resin used as the dispersant from being removed together with the components derived from the polysaccharide compound, it is preferable that a separation membrane do not have an excessively large pore size or an excessively large cutoff molecular weight.

Step (iv)

In the step (iv), of the components derived from the polysaccharide compound released in the step (ii), components having a larger size than that of the pigment are removed from a liquid containing the pigment. Specifically, of the components derived from the polysaccharide compound, components having a larger size than that of the pigment can be removed by microfiltration, for example. As the filter material, a filter paper, a membrane filter, and a glass fiber filter can be used, for example.

Step (v)

In the step (v), the alkali component or the acid component used in the step (ii) is removed from the liquid containing the pigment. The removal method is not limited to particular methods, and a known method can be used. For example, a separation method exemplified in the step (iii), such as ultrafiltration, filter pressing, disk filtering, and centrifugation, can be performed once or more. In the case of centrifugation, a liquid to be treated is placed in a centrifuge tube and is centrifuged to settle the pigment, and a supernatant liquid is removed. Next, a liquid such as water is added into and mixed with the settled pigment. In the case of ultrafiltration, the filtrate containing an alkali component or an acid component is removed, and water is added in the same amount as that of the removed filtrate. By repeating such a process as needed, the alkali component or the acid component is removed, and the pH of a liquid containing the pigment can be appropriately adjusted. In addition to the above methods, a method of utilizing salt from by neutralization (a method in which an acid component is added to the liquid containing a pigment and an alkali component to form a salt and the salt is removed to appropriately adjust the pH of the liquid) and a method of using an ion exchange resin to remove an alkali component or an acid component can also be used.

Pigment

The ink of the present invention contains a pigment as a coloring material. The pigment is exemplified by inorganic pigments such as carbon black and organic pigments that are known in the art. Specifically, carbon black or an organic pigment is preferably used. The content (% by mass) of the pigment in the ink is preferably 0.1% by mass or more to 15.0% by mass or less and more preferably 1.0% by mass or more to 10.0% by mass or less based on the total mass of the ink.

The pigment is dispersed in the ink by a resin dispersant which is a resin for dispersing a pigment. In other words, the pigment used in the ink of the present invention is a resin-dispersed pigment that is dispersed in an ink by the function of a resin dispersant physically adsorbed onto the particle surface.

Resin Dispersant

As the resin dispersant, a dispersant having an anionic group that enables a pigment to be dispersed in an aqueous medium is preferably used. The resin dispersant is more preferably a resin including a unit having an aromatic group and a unit represented by General Formula (2).

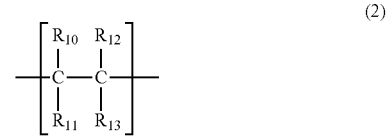

(2)

(In General Formula (2), each of $R_{10}$ to $R_{13}$ is independently a hydrogen atom, an alkyl group having 1 to 8 carbon atoms, a cycloalkyl group having 4 to 8 carbon atoms, a carboxylic acid group, or an alkyl group having 1 to 5 carbon atoms and being substituted with a carboxylic acid group; and at least one of is a carboxylic acid group or an alkyl group having 1 to 5 carbon atoms and being substituted with a carboxylic acid group, and the rest of $R_{10}$ to $R_{13}$ are a hydrogen atom, an alkyl group having 1 to 8 carbon atoms, or a cycloalkyl group having 4 to 8 carbon atoms.)

Unit Having Aromatic Group

The unit having an aromatic group (hereinafter also referred to as "aromatic-group-containing unit") is a unit functioning as a hydrophobic unit of the resin dispersant. More specifically, the aromatic-group-containing unit is a unit exhibiting a function of physically adsorbing to the particle surface of a pigment due to hydrophobic interaction. The aromatic-group-containing unit is formed by (co)polymerization of a monomer having an aromatic group. The aromatic group of the aromatic-group-containing unit is exemplified by a phenyl group, a benzyl group, a tolyl group, an o-xylyl group, and a naphthyl group.

Specific examples of the monomer having an aromatic group include aromatic vinyl compounds such as styrene and α-methylstyrene; ester compounds of an α,β-ethylenically unsaturated carboxylic acid and an aromatic-group-containing alkyl alcohol such as benzyl (meth)acrylate and 2-phenoxyethyl (meth)acrylate; amide compounds of an α,β-ethylenically unsaturated carboxylic acid and an aromatic-group-containing alkylamine such as benzyl(meth) acrylamide and 2-phenoxyethyl(meth)acrylamide; and other compounds such as 2-hydroxy-3-phenoxypropyl (meth) acrylate and 2-(meth)acryloxyethylphthalic acid.

The proportion (% by mass) of the aromatic-group-containing unit in the resin dispersant is preferably 40% by mass or more to 80% by mass or less based on the total mass of the resin dispersant. When the proportion is less than 40% by mass, the amount of the hydrophobic unit is insufficient, thus a resin dispersant is unlikely to adsorb to the particle surface of a pigment, and the ink may have insufficient storage stability. When the proportion is more than 80% by mass, the hydrophobic interaction between the resin dispersant molecules may be excessively high. On this account, the resin dispersant is likely to aggregate to increase the viscosity of the ink, and the performance of suppressing the irregular ejection of the ink may be slightly reduced.

Unit Represented by General Formula (2)

Specific examples of the monomer that is (co)polymerized to form the unit represented by General Formula (2) include unsaturated mono- or di-carboxylic acids such as acrylic acid, methacrylic acid, maleic acid, itaconic acid, and fumaric acid; derivatives such as anhydrides of these unsaturated mono- or di-carboxylic acids; and salts of these unsaturated mono- or di-carboxylic acids. Specifically preferred are acrylic acid and methacrylic acid. Examples of the cation to form a salt include cations of alkali metals such as lithium, sodium, and potassium; an ammonium ion; and organic ammonium ions. Specifically preferred are a sodium ion and a potassium ion.

Unit represented by General Formula (3), unit represented by General Formula (4)

The resin dispersant preferably further has a unit represented by General Formula (3) or a unit represented by General Formula (4).

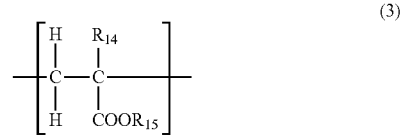

(3)

(In General Formula (3), $R_{14}$ is a hydrogen atom or a methyl group; and $R_{15}$ is an alkyl group having 1 to 16 carbon atoms, a cycloalkyl group having 3 to 10 carbon atoms, an alkyl group having 1 to 6 carbon atoms and being substituted with a primary to tertiary amino group, a group in which an alkylene group having 1 to 6 carbon atoms is bonded to a fluoroalkyl group having 1 to 10 carbon atoms, or a group in which an alkylene group having 1 to 6 carbon atoms is bonded to a group having a siloxane structure.)

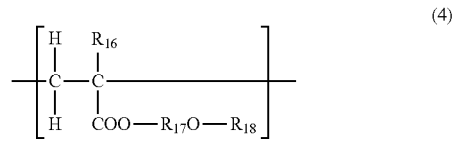

(4)

(In General Formula (4), $R_{16}$ is a hydrogen atom or a methyl group; $R_{17}$ is an alkylene group having 2 to 6 carbon atoms; $R_{18}$ is a hydrogen atom, an alkyl group having 1 to 18 carbon atoms, or a cycloalkyl group having 3 to 10 carbon atoms; and n is an integer of 1 to 10.)

When a resin dispersant having the unit represented by General Formula (3) or the unit represented by General Formula (4) is used, the dispersion stability of a pigment is improved, and the irregular ejection can be more effectively suppressed. The inventors of the present invention suppose the following reason to achieve such an effect. To improve the dispersion stability of a pigment, it is advantageous to use, as the dispersant, a resin that is likely to adsorb to the particle surface of a pigment and is likely to cause steric repulsion. The aromatic-group-containing unit adsorbs to the particle surface of a pigment due to the hydrophobic interaction of an aromatic group. However, the adsorption only due to the hydrophobic interaction of an aromatic group may cause release of the resin depending on factors such as the formulation and storage temperature of an ink. Meanwhile, the polysaccharide compound with which a pigment is impregnated has very high hydrogen bond formability. The unit represented by General Formula (2) also has high hydrogen bond formability. In addition, the unit represented by General Formula (3) and the unit represented by General Formula (4) each have an ester bond and thus have hydrogen bond formability. In other words, the polysaccharide compound forms hydrogen bonds with the unit represented by General Formula (2), with the unit represented by General Formula (3), and with the unit represented by General Formula (4) in the resin dispersant, and the resin firmly adsorbs to the particle surface of the pigment due to the hydrogen bonds together with the hydrophobic interaction. It is thought that by the above mechanism, the release of the resin from the particle surface of the pigment is effectively suppressed, and the dispersion stability of the pigment is improved.

A resin having the unit represented by General Formula (2) and having the unit represented by General Formula (3) or the unit represented by General Formula (4) is not only likely to adsorb to the particle surface of a pigment but also likely to cause steric repulsion, and thus can improve the dispersion stability of the pigment. For example, a resin having only the aromatic-group-containing unit and the unit represented by General Formula (2) is rigid and has poor degree of steric freedom. In contrast, a resin further having the unit represented by General Formula (3) or the unit represented by General Formula (4) has high degree of steric freedom. Such a resin can suppress the aggregation of a pigment due to the steric repulsion even in such conditions that pigment particles are present closer to each other, and can improve the dispersion stability.

Specific examples of the monomer that is (co)polymerized to form the unit represented by General Formula (3) include ester compounds of (meth)acrylic acid and alkanols having 1 to 16 carbon atoms; ester compounds of (meth)acrylic acid and cycloalkanols having 3 to 10 carbon atoms; ester compounds of (meth)acrylic acid and alkanols having 1 to 6 carbon atoms and being substituted with a primary to tertiary amino group; ester compounds of (meth)acrylic acid and alkanols having 1 to 6 carbon atoms and being substituted with a fluoroalkyl group having 1 to 10 carbon atoms; and ester compounds of (meth)acrylic acid and alkanols having 1 to 6 carbon atoms and being substituted with a group having a siloxane structure. The alkyl group moiety of the alkanols may be either a straight chain or a branched chain. The alkanols and the cycloalkanols may have a substituent such as alkyl groups.

The ester compound of (meth)acrylic acid and an alkanol having 1 to 16 carbon atoms is exemplified by methyl (meth)acrylate, butyl (meth)acrylate, pentyl (meth)acrylate, hexyl (meth)acrylate, octyl (meth)acrylate, decyl (meth)acrylate, lauryl (meth)acrylate, cetyl (meth)acrylate, and 2-ethylhexyl (meth)acrylate.

The ester compound of (meth)acrylic acid and an cycloalkanol having 3 to 10 carbon atoms is exemplified by cyclopropyl (meth)acrylate, cyclobutyl (meth)acrylate, cyclopentyl (meth)acrylate, cyclohexyl (meth)acrylate, cyclooctyl (meth)acrylate, cyclodecyl (meth)acrylate, isobornyl (meth)acrylate, norbornyl (meth)acrylate, dicyclopentanyl (meth)acrylate, dicyclopentenyl (meth)acrylate, dicyclopentenyloxyalkyl (meth)acrylate, adamantyl (meth)acrylate, tetrahydrofurfuryl (meth)acrylate, γ-butyrolactone (meth)acrylate, piperidine (meth)acrylate, maleimide (meth)acrylate, and oxazoline (meth)acrylate.

The ester compound of (meth)acrylic acid and an alkanol having 1 to 6 carbon atoms and being substituted with a primary to tertiary amino group is exemplified by 2-(dimethylamino)ethyl acrylate, 3-(dimethylamino)propyl acrylate, 2-(dimethylamino)ethyl methacrylate, 3-(dimethylamino)propyl methacrylate, 2-(diethylamino)ethyl methacrylate, and 2-(diethylamino)propyl methacrylate.

The ester compound of (meth)acrylic acid and an alkanol having 1 to 6 carbon atoms and being substituted with a fluoroalkyl group having 1 to 10 carbon atoms is exemplified by compounds represented by General Formula (3-1).

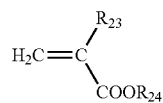

(3-1)

In General Formula (3-1), $R_{23}$ is a hydrogen atom or a methyl group. $R_{24}$ is any group shown below. $(CH_2)_2$ $(CF_2)_{10}F$, $(CH_2)_2(CF_2)_8F$, $(CH_2)_2(CF_2)_6F$, $CH_2(CF_2)_6F$, $CH_2(CF_2)_7F$, $CH_2(CF_2)_2H$, $CH_2(CF_2CF_2)_2H$, $CH_2(CF_2CF_2)_4H$, $CH_2CF_2OCF_2CF_2OCF_3$, $CH_2CF_2O(CF_2CF_2O)_3CF_3$, $CH_2CF(CF_3)OCF_2CF(CF_3)O(CF_2)_3F$, $CH_2CF(CF_3)O$ $(CF_2CF(CF_3)O)_2(CF_2)_3F$, $CH_2CH(OH)CH_2(CF_2)_6CF$ $(CF_3)_2$, $CH_2CH(CH_2OH)$ $CH_2(CF_2)_6CF(CF_3)_2$, $CH_2CH$ $(OH)CH_2(CF_2)_{10}F$, $CH_2CH(OH)CH_2(CF_2)_{10}F$, $CH_2CH_2$ $(CF_2CF_2)_3CH_2CH_2OCOCH=CH_2$, $CH_2CH_2(CF_2CF_2)_3$ $CH_2CH_2OCOC(CH_3)=CH_2$.

The ester compound of (meth)acrylic acid and an alkanol having 1 to 6 carbon atoms and being substituted with a group having a siloxane structure is exemplified by compounds represented by General Formula (5). Commercial products of the compound represented by General Formula (5) include Silaplane FM-0711, FM-0721, and FM-0725 (trade name, manufactured by Chisso), for example.

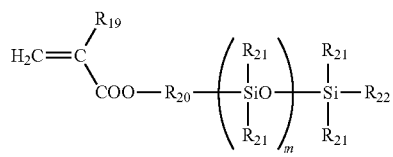

(5)

(In General Formula (5), $R_{19}$ is a hydrogen atom or a methyl group; $R_{20}$ is an alkylene group having 1 to 6 carbon atoms; each $R_{21}$ is independently a methyl group or a phenyl group; $R_{22}$ is an alkyl group having 1 to 6 carbon atoms or an aryl group having 6 to 10 carbon atoms; and m is an integer of 1 to 150.)

Of the above specific examples, the monomer constituting the unit represented by General Formula (3) is preferably cyclohexyl (meth)acrylate or tetrahydrofurfuryl (meth)acrylate.

The monomer constituting the unit represented by General Formula (4) is exemplified by mono(meth)acrylates having a terminal hydroxy group and mono(meth)acrylates of polyalkylene glycols having a terminal alkyl group. The monomer is more specifically exemplified by polyethylene glycol mono(meth)acrylate, polypropylene glycol mono(meth)acrylate, methoxypolyethylene glycol (meth)acrylate, lauroxy-polyethylene glycol (meth)acrylate, stearoxy-polyethylene glycol (meth)acrylate, and acrylic acrylate.

Physical Properties of Resin

The resin dispersant preferably has an acid value of 80 mg KOH/g or more to 250 mg KOH/g or less and more preferably 100 mg KOH/g or more to 200 mg KOH/g or less. When a resin dispersant has an acid value of less than 100 mg KOH/g, the hydrophobic interaction between the resin molecules is increased, and thus the resin is likely to aggregate. Hence, the ink has higher viscosity, and the performance of suppressing the irregular ejection may slightly deteriorate. When a resin dispersant has an acid value of more than 200 mg KOH/g, the amount of the hydrophobic unit is insufficient, and the resin is unlikely to adsorb to the particle surface of a pigment. Hence, the ink may have insufficient storage stability.

The resin dispersant preferably has a weight-average molecular weight of 1,000 or more to 30,000 or less and more preferably 3,000 or more to 15,000 or less. The weight-average molecular weight of a resin dispersant is a value determined by gel permeation chromatography (GPC) in terms of polystyrene. When a resin dispersant has a weight-average molecular weight of less than 3,000, the resin is unlikely to adsorb to the particle surface of a pigment, and the ink may have insufficient storage stability. When a resin dispersant has a weight-average molecular weight of more than 15,000, the ink has higher viscosity, and the performance of suppressing the irregular ejection may slightly deteriorate.

The content (% by mass) of the resin dispersant in the ink is preferably 0.1% by mass or more to 5.0% by mass or less and more preferably 0.5% by mass or more to 2.0% by mass or less based on the total mass of the ink. The content (% by mass) of the resin dispersant in the ink, in terms of mass ratio to the content (% by mass) of the pigment is preferably 0.05 times or more to 0.50 times or less and more preferably 0.10 times or more to 0.30 times or less. When the mass ratio is less than 0.05 times, the dispersion stability of the pigment deteriorates, and the irregular ejection may not be sufficiently suppressed. When the mass ratio is more than 0.50 times, the resin is partly, likely to be released from the particle surface of a pigment, and a resulting image may have insufficient optical density. This is thought to be because a polysaccharide compound eluted from a pigment upon application of an ink to a recording medium is incorporated into the released resin and the increase of viscosity upon evaporation of a liquid component is suppressed.

Synthetic Method of Resin Dispersant

The resin dispersant can be synthesized by various known methods. To synthesize a resin dispersant, a polymerization initiator and a chain transfer agent can be used.

The polymerization initiator is exemplified by persulfates; organic peroxides such as dibenzoyl peroxide; azo compounds such as 2,2'-azobis(2-methylbutyronitrile); and inorganic peroxides. The amount (% by mass) of the polymerization initiator is preferably 0.1% by mass or more to 10.0% by mass or less based on the total amount of monomers.

As the chain transfer agent, thiol chain transfer agents can be used, for example. The amount (% by mass) of the chain transfer agent is preferably 2.0% by mass or more to 13.0% by mass or less based on the total amount of monomers. When a chain transfer agent is used in an amount of less than 2.0% by mass, the amount of the sulfur atom is insufficient relative to a resulting resin dispersant. Such a resin dispersant is likely to have lower binding strength due to a hydrogen bond with a polysaccharide compound, and the ink may have insufficient storage stability. When a chain transfer agent is used in an amount of more than 13.0% by mass, the amount of the sulfur atom becomes excessive relative to a resulting resin dispersant. Such a resin dispersant is likely to have higher binding strength due to a hydrogen bond with a polysaccharide compound, thus the ink is likely to have higher viscosity, and the performance of suppressing the irregular ejection of an ink may slightly deteriorate.

Examples of the thiol chain transfer agent include aromatic-group-containing mercaptans; linear alkyl mercaptans; branched alkyl mercaptans; cyclic alkyl mercaptans such as 1-thioglycerol; and substituted alkyl mercaptans such as 1-thioglycerol.

The thiol chain transfer agent can be tri-functional or higher-functional thiol chain transfer agents including ester compounds of a polyhydric alcohol and thioglycolic acid or thiopropionic acid, such as dipentaerythritol hexakis-thiopropionate.

Analysis Method of Resin

The formulation and physical properties including molecular weight of a resin can be analyzed by known methods. The formulation and physical properties including molecular weight of a resin can also be determined by analyzing each of the sediment and the supernatant liquid prepared by centrifugation of an ink containing the resin. Although analysis can be performed in the state of ink, the use of an extracted resin can further improve analysis precision. Specifically, an ink is first centrifuged at 200,000 G for 30 minutes to give a liquid phase, and a resin is extracted from the liquid phase. Next, the extracted resin can be analyzed by using a pyrolysis gas chromatography/mass spectrometry (Py-GC/MS) to determine the unit type constituting the resin. Separately, the extracted resin can be quantitatively analyzed by nuclear magnetic resonance method (NMR) or a Fourier transformation infrared spectrometer (FT-IR) to determine the monomer type constituting the resin, the molecular weight, and content, and the like. When the resin is a block copolymer or a graft copolymer, MALDI-TOF-MS can be used to determine the continuity of a unit constituting the resin. The acid value of a resin can be determined by titrimetry. The neutralizer type of an acid group of a resin can be identified by electrophoresis chromatography. The weight-average molecular weight (Mw) and the number-average molecular weight (Mn) of a resin can be determined by gel permeation chromatography (GPC). The volume-average particle diameter of a resin can be determined by dynamic light scattering method.

When an ink contains, in addition to the resin dispersant, a resin different from the resin dispersant (additional resin), the resin dispersant and the additional resin can be separated by the following procedure. The difference between a resin dispersant and an additional resin means a difference in at least one of the type and the ratio of constitutional units and physical properties of resins including acid value and weight-average molecular weight. A resin dispersant and an additional resin can be slightly exchanged in an ink in a common pH range and surface tension range of an aqueous ink. The amount is, however, extremely small, and thus such a phenomenon is negligible. As a prerequisite, the resin dispersant and the additional resin are distinguished by the adsorption amount to a pigment. In other words, a resin adsorbed to a pigment in a larger amount is the resin dispersant, and the other resins are additional resins.

When a plurality of resins is present in a system, the resins can undergo adsorption exchange theoretically. However, in the case of an aqueous ink for ink jet, the adsorption exchange does not proceed to such an extent as to cause a resin dispersant and an additional resin to change places. This is because the additional resin is used to expect the function for image properties, reliability, or the like. If an additional resin expected to exert such a function causes adsorption exchange with the resin dispersant when used in combination, the use of the additional resin would be meaningless in the first place.

An ink containing a pigment, a resin dispersant, and an additional resin is centrifuged at 200,000 G for 30 minutes to separate a sediment (containing the pigment and the resin adsorbed to the pigment). The sediment is washed with an acid and is sufficiently dried. The dried sediment is added to an organic solvent such as tetrahydrofuran, and the resultant is stirred to elute the resin adsorbed to the pigment into the organic solvent. Then, the liquid is centrifuged at 5,000 G for 5 minutes to separate the pigment being the sediment from the resin dissolved in the organic solvent. The liquid component is dried into a solid to give the resin that has been adsorbed to the pigment, or the resin dispersant. Meanwhile, the resin not having adsorbed to the pigment is contained in the liquid phase after the centrifugation at 200,000 G for 30 minutes. To the liquid phase, an acid or the like is added to cause the resin to aggregate. The resin aggregate is collected, then thoroughly washed with water, and dried, giving the resin that has not been absorbed to the pigment, or the additional resin. The resin dispersant and the additional resin prepared as above can be subjected to the above-described analysis techniques to reveal various properties.

In the above procedure, "resin that has been adsorbed to the pigment" may contain a small amount of "resin that has not been adsorbed to the pigment", and the "resin that has not been adsorbed to the pigment" may contain a small amount of "resin that has been adsorbed to the pigment". In such a case, the resin having the largest mass proportion of "resins that have been adsorbed to the pigment" can be considered to be the resin dispersant, for example.

Aqueous Medium

The ink of the present invention is an aqueous ink containing at least water as the aqueous medium. The ink can contain an aqueous medium that is a mixed solvent of water and a water-soluble organic solvent. As the water, deionized water or ion-exchanged water is preferably used. The content (% by mass) of water in the aqueous ink is preferably 50.0% by mass or more to 95.0% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, a sulfur-containing polar solvent, and the like. The content (% by mass) of the water-soluble organic solvent in the ink is preferably 3.0% by mass or more to 50.0% by mass or less based on the total mass of the ink.

Other Additives

The ink of the present invention can contain various additives such as a surfactant, a pH adjuster, an anticorrosive, an antiseptic agent, an antifungal agent, an antioxidant, a reduction inhibitor, an evaporation accelerator, and a chelating agent, as needed.

Examples of the surfactant include anionic, cationic, and nonionic surfactants. The content (% by mass) of the surfactant in the ink is preferably 0.1% by mass or more to 5.0% by mass or less and more preferably 0.1% by mass or more to 2.0% by mass or less based on the total mass of the ink.

Physical Properties of Ink

The ink of the present invention is an ink for ink jet applied to an ink jet system. Hence, the physical property values thereof are preferably controlled to appropriate values. Specifically, the ink preferably has a surface tension of 10 mN/m or more to 60 mN/m or less and more preferably 20 mN/m or more to 60 mN/m or less at 25° C. More specifically, the surface tension is preferably 30 mN/m or more to 50 mN/m or less and particularly preferably 30 mN/m or more to 40 mN/m or less. The ink preferably has a viscosity of 1.0 mPa·s or more to 10.0 mPa·s or less, more preferably 1.0 mPa·s or more to 5.0 mPa·s or less, and particularly preferably 1.0 mPa·s or more to 3.0 mPa·s or less at 25° C. The ink preferably has a pH of 5.0 or more to 10.0 or less at 25° C. Specifically, the pH is preferably 6.0 or more to 8.5 or less.

Method for Producing Ink

The ink of the present invention can be produced by a method for producing a common aqueous ink for ink jet except that the pigment impregnated with a polysaccharide compound is used. Specifically, the ink can be produced by performing step (1) of preparing a pigment impregnated with a polysaccharide compound and step (2) of mixing ink components including the pigment. The step (1) can be performed in accordance with the above method of impregnating a pigment with a polysaccharide compound. The subsequent steps can be performed in the same manner as a method for producing a common aqueous ink for ink jet, and additional steps such as purification can be performed, as needed.

Ink Cartridge

The ink cartridge of the present invention includes an ink and an ink storage portion that stores the ink. The ink stored in the ink storage portion is the above-described ink of the present invention. FIG. 1 is a schematic sectional view illustrating an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20, and the absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

Ink Jet Recording Method

The ink jet recording method of the present invention is a method in which the above-described ink of the present invention is ejected from an ink jet recording head to record an image on a recording medium. The system for ejecting the ink is exemplified by a system of applying mechanical energy to an ink and a system of applying thermal energy to an ink. In the present invention, a system of applying thermal energy to an ink to eject the ink is particularly preferably used. The ink jet recording method can include known steps except that the ink of the present invention is used.

Figure 2A:
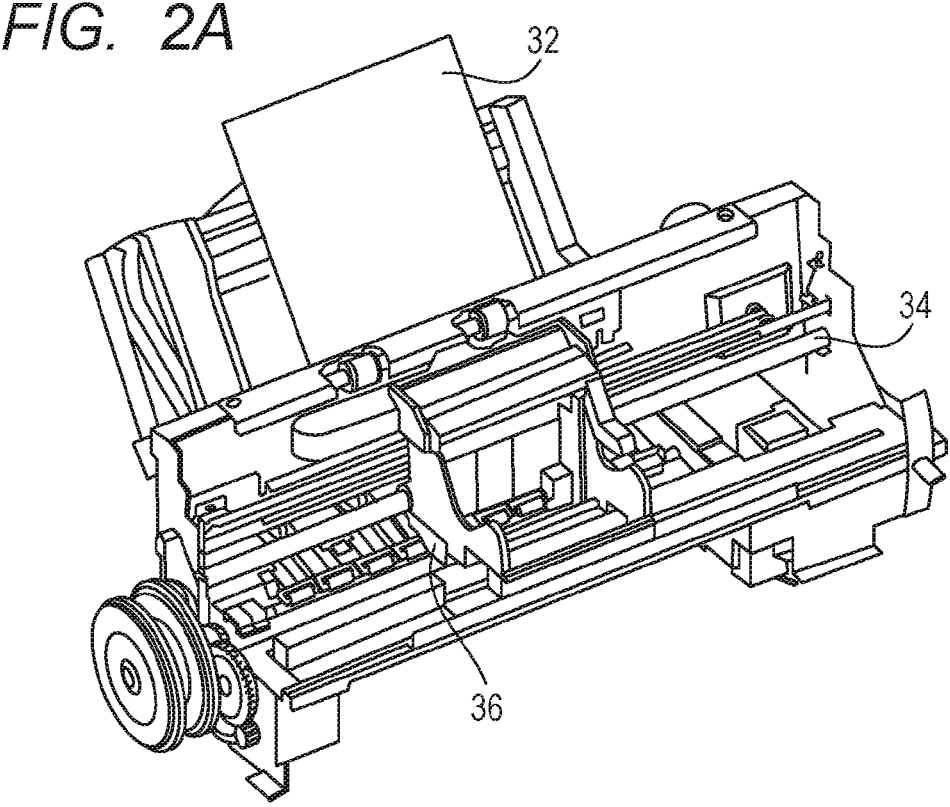
FIGS. 2A and 2B are schematic views illustrating an exemplary ink jet recording apparatus used for an ink jet recording method of the present invention.
Figure 2B:
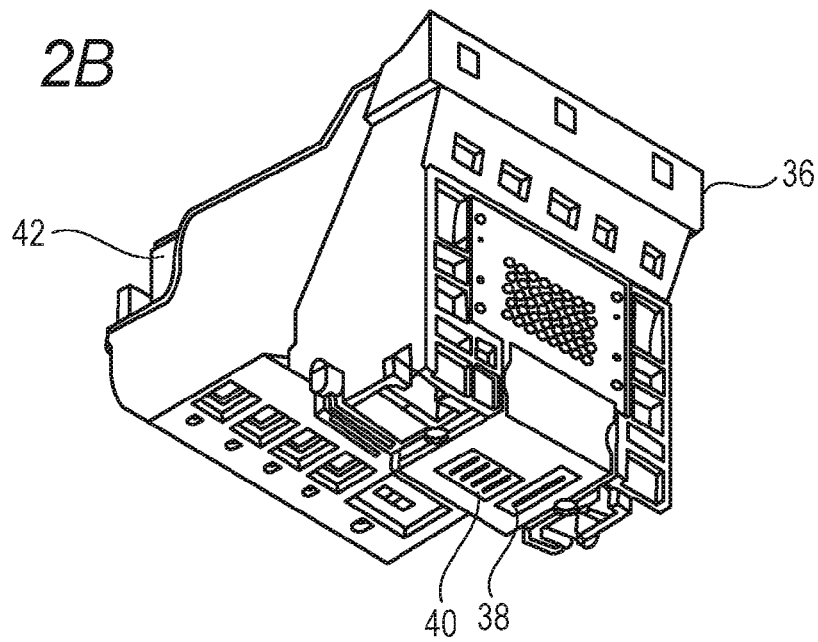

FIGS. 2A and 2B are schematic views illustrating an exemplary ink jet recording apparatus used for the ink jet recording method of the present invention; FIG. 2A is a perspective view of a principal part of the ink jet recording apparatus; and FIG. 2B is a perspective view of a head cartridge. The ink jet recording apparatus includes a conveyance unit (not illustrated) for conveying a recording medium 32 and a carriage shaft 34. On the carriage shaft 34, a head cartridge 36 can be installed. The head cartridge 36 includes recording heads 38 and 40 and is so constructed that an ink cartridge 42 can be set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be an object for recording by using the ink of the present invention may be any recording medium, and can be selected depending on an intended use purpose of a recorded product on which an image is recorded. The recording medium is exemplified by papers having permeability, such as plain papers and recording media having a coating layer. For example, plain papers suitable for giving images such as business texts can be used. The recording medium can also be glossy papers that are suitable for giving images having glossiness of photographic image quality and art papers that take advantage of surface textures (for example, a mat texture, a drawing paper texture, a canvas texture, and a Japanese paper texture) in order to express preferred images such as pictures, photographs, and graphic images. In particular, recording media including plain papers having no coating layer and recording media including coated papers having a coating layer are preferably used.

EXAMPLES

The present invention will next be described in further detail with reference to examples and comparative examples, but the invention is not intended to be limited to the following examples without departing from the scope of the invention. The component amounts with "part(s)" or "%" are based on mass unless otherwise noted.

Synthesis of Resins

Resins 1 to 12

In a flask equipped with a stirrer, a nitrogen inlet tube, a reflux condenser, and a thermometer, 200.0 parts of isopropanol was placed and then was heated to 85° C. under a nitrogen atmosphere with stirring. A monomer mixture shown in Table 3, a liquid containing a polymerization initiator, and a chain transfer agent were each added dropwise into the flask over 2 hours while being maintained at 80° C. As a liquid containing a polymerization initiator, a solution prepared by dissolving 5.0 parts of trade name "PERKADOX L-W75 (LS)" (manufactured by Kayaku Akzo, dibenzoyl peroxide, purity: 75%) in 10.0 parts of isopropanol was used. While the inner temperature was maintained at 80° C., the mixture was stirred for 4 hours to synthesize a resin. To the resin, 0.9 equivalent of potassium hydroxide relative to the acid value of the resin and an appropriate amount of ion-exchanged water were added, then isopropanol was removed under reduced pressure, and a liquid having a resin content (solid content) of 20.0% was prepared. The resins prepared in this manner were used as resin dispersants for dispersing a pigment. The abbreviations in Table 3 mean the following substances.

St: styrene

BzMA: benzyl methacrylate

MMA: methyl methacrylate nBA: n-butyl acrylate

CHMA: cyclohexyl methacrylate

FM-0711: Silaplane FM-0711 (a monomer represented by General Formula (5), manufactured by Chisso)

FAAC-6: 2-(perfluorohexyl)ethyl acrylate (trade name, manufactured by Unimatec)

EGDMA: ethylene dimethacrylate

MAA: methacrylic acid

AA: acrylic acid

Chain transfer agent 1: a solution prepared by dissolving 1.9 parts of 1-thioglycerol in 10.0 parts of isopropanol Chain transfer agent 2: a solution prepared by dissolving 1.9 parts of 1-hexanethiol in 10.0 parts of isopropanol Chain transfer agent 3: a solution prepared by dissolving 10.0 parts of dipentaerythritol hexakis-thiopropionate in 10.0 parts of isopropanol

TABLE 3

Synthetic conditions and properties of resins

| | | | | Monomer (parts) | | | | | | | Type of chain transfer agent | Properties | |
|---|---|---|---|---|---|---|---|---|---|---|---|---|---|
| | | | | | | | | | | | | Weight-average molecular weight | Acid value (mgKOH/g) |
| Resin | St | BzMA | MMA | nBA | CHMA | FM-0711 | FAAC-6 | EGDMA | AA | MAA | | | |
| 1 | 60 | | 22 | | | | | | 18 | | — | 9,000 | 140 |
| 2 | 60 | | 18 | | | | | | | 22 | — | 9,000 | 140 |
| 3 | | 60 | 22 | | | | | | 18 | | — | 9,000 | 140 |
| 4 | 70 | | | | 12 | | | | 18 | | — | 9,000 | 140 |
| 5 | 60 | | | | | 22 | | | 18 | | — | 9,000 | 140 |
| 6 | 60 | | | | | | 22 | | 18 | | — | 9,000 | 140 |
| 7 | 60 | | 15 | | | | | 7 | 18 | | — | 12,000 | 140 |
| 8 | 60 | | 22 | | | | | | 18 | | 1 | 9,000 | 140 |
| 9 | 60 | | 22 | | | | | | 18 | | 2 | 9,000 | 140 |
| 10 | 60 | | 22 | | | | | | 18 | | 3 | 5,000 | 140 |
| 11 | | | 82 | | | | | | 18 | | — | 9,000 | 140 |
| 12 | 82 | | | | | | | | 18 | | — | 9,000 | 140 |

Production of Pigment

Components shown in Table 4 were mixed, and the mixture was fed in a twin-screw kneading extruder (trade name "TEM-26SX", manufactured by Toshiba Machine) and kneaded. The pigment was pulverized and then was washed to remove dimethyl sulfoxide, giving each of the pigments 1 to 26. The quinacridone solid solution contains a solid solution pigment of C.I. Pigment Red 122 and C.I. Pigment Violet 19.

An endotoxin measurement system (trade name "Toxinometer ET6000, SLP Reagent Set", manufactured by Wako Pure Chemical Industries) was used to analyze the pigments 1 to 25. The result revealed that each pigment was impregnated with a polysaccharide compound. The polysaccharide compound with which the pigment is impregnated was analyzed by using an HPLC equipped with a column for sugar analysis (trade name "Shim-pack SCR-101P, manufactured by Shimadzu Corporation). The result revealed that with the same polysaccharide compound as that used for the production of the pigment the resulting pigment was impregnated. The result also revealed that the pigment 26 was impregnated with no polysaccharide compound.

TABLE 4

Preparation conditions of pigment

| | | Crude pigment (parts) | | Dimethyl sulfoxide (parts) | Polysaccharide compound (ppm based on pigment) | |
|---|---|---|---|---|---|---|
| Pigment | 1 | C.I. Pigment Blue 15:3 | 95.5 | 4.0 | Lipopolysaccharide | 5,000 |
| | 2 | C.I. Pigment Yellow 74 | 95.5 | 4.0 | Lipopolysaccharide | 5,000 |
| | 3 | C.I. Pigment Yellow 155 | 95.5 | 4.0 | Lipopolysaccharide | 5,000 |
| | 4 | Quinacridone solid solution | 95.5 | 4.0 | Lipopolysaccharide | 5,000 |
| | 5 | C.I. Pigment Red 122 | 95.5 | 4.0 | Lipopolysaccharide | 5,000 |
| | 6 | C.I. Pigment Red 149 | 95.5 | 4.0 | Lipopolysaccharide | 5,000 |
| | 7 | C.I. Pigment Red 150 | 95.5 | 4.0 | Lipopolysaccharide | 5,000 |
| | 8 | C.I. Pigment Red 254 | 95.5 | 4.0 | Lipopolysaccharide | 5,000 |
| | 9 | C.I. Pigment Violet 19 | 95.5 | 4.0 | Lipopolysaccharide | 5,000 |
| | 10 | C.I. Pigment Violet 23 | 95.5 | 4.0 | Lipopolysaccharide | 5,000 |
| | 11 | C.I. Pigment Orange 43 | 95.5 | 4.0 | Lipopolysaccharide | 5,000 |
| | 12 | C.I. Pigment Orange 64 | 95.5 | 4.0 | Lipopolysaccharide | 5,000 |
| | 13 | C.I. Pigment Green 7 | 95.5 | 4.0 | Lipopolysaccharide | 5,000 |
| | 14 | C.I. Pigment Green 36 | 95.5 | 4.0 | Lipopolysaccharide | 5,000 |
| | 15 | Carbon black | 95.5 | 4.0 | Lipopolysaccharide | 5,000 |
| | 16 | C.I. Pigment Blue 15:3 | 95.5 | 4.0 | Xanthan gum | 5,000 |
| | 17 | C.I. Pigment Blue 15:3 | 95.5 | 4.0 | Hyaluronic acid | 5,000 |
| | 18 | C.I. Pigment Blue 15:3 | 95.5 | 4.0 | Gellan gum | 5,000 |
| | 19 | C.I. Pigment Blue 15:3 | 95.5 | 4.0 | Ganglioside (GQ1b) | 5,000 |
| | 20 | C.I. Pigment Blue 15:3 | 95.5 | 4.0 | Peptidoglycan | 5,000 |
| | 21 | C.I. Pigment Blue 15:3 | 95.5 | 4.0 | Lipoteichoic acid | 5,000 |
| | 22 | C.I. Pigment Blue 15:3 | 95.5 | 4.0 | Guar gum | 5,000 |
| | 23 | C.I. Pigment Blue 15:3 | 95.5 | 4.0 | Dextran | 5,000 |
| | 24 | C.I. Pigment Blue 15:3 | 96.0 | 4.0 | Lipopolysaccharide | 2 |
| | 25 | C.I. Pigment Blue 15:3 | 96.0 | 4.0 | Lipopolysaccharide | 1 |
| | 26 | C.I. Pigment Blue 15:3 | 100.0 | | | |

Lipopolysaccharide: An extract of a culture of a Gram-negative bacterium (E. coli) was used.
Peptidoglycan: An extract of a culture of Sphingomonas paucimobilis was used.
Lipoteichoic acid: A compound in which a peptidoglycan extracted from a culture of a Gram-negative bacterium was bonded to teichoic acid was used.

Preparation of Pigment Dispersion Liquid

Pigment Dispersion Liquids I-1 to I-42

The components shown below were mixed, and the mixture was subjected to dispersion treatment by using a high-pressure homogenizer (trade name "Starburst", manufactured by Sugino Machine) at a treatment pressure of 245 MPa. An appropriate amount of ion-exchanged water was then added to give each pigment dispersion liquid.

A pigment shown in Table 5: 20.0 parts

A liquid containing a resin shown in Table 5: amount (parts) shown in Table 5

Ion-exchanged water: residual amount to give a component total amount of 100.0 parts Pigment Dispersion Liquid I-43

A solution prepared by dissolving 60 mmol of concentrated hydrochloric acid in 5.5 g of water was cooled at 5° C., and to the cooled solution, 8.28 mmol of 4-aminophthalic acid was added. The container containing the solution was put in an ice bath. While the solution was stirred to maintain a temperature of 10° C. or less, a solution prepared by dissolving 21.2 mmol of sodium nitrite in 9.0 g of water at 5° C. was added. After stirring for 15 minutes, 6.0 g of the pigment 1 was added under stirring followed by additional stirring for 15 minutes to give a slurry. The obtained slurry was filtered through a filter paper (trade name "Standard filter paper No. 2", manufactured by ADVANTEC), and the particles were thoroughly washed with water, and dried in an oven at 110° C. An appropriate amount of ion-exchanged water was added to adjust the pigment content, and a pigment dispersion liquid I-43 having a pigment content of 15.0% was prepared.

Quantitative Determination of Polysaccharide Compound

The prepared pigment dispersion liquid was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound, and the mass ratio (ppm) to the pigment was calculated. The prepared pigment dispersion liquid was subjected to ultrafiltration through the ultrafiltration membrane shown below by a diafiltration system to remove a polysaccharide compound present in a free state in the pigment dispersion liquid.

Ultrafiltration membrane

Type: modified polyethersulfone hollow fiber module (trade name "MicroKros", manufactured by Spectrum Laboratories)

Cutoff molecular weight: 100 kDa

Membrane area: 1,600 $cm^2$

Inner diameter: 0.5 mm

The pigment dispersion liquid after removal of the polysaccharide compound present in a free state was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound. The quantitative determination result of the polysaccharide compound in the pigment dispersion liquid without ultrafiltration was compared with the quantitative determination result of the polysaccharide compound in the pigment dispersion liquid after ultrafiltration to calculate the amount of the polysaccharide compound with which the pigment is impregnated (impregnated amount) and the amount of the polysaccharide compound present in a free state (free amount). The results are shown in Table 5.

TABLE 5

Preparation conditions and properties of pigment dispersion liquid

| | | | | | Properties | | Mass ratio of amount of polysaccharide compound to amount of pigment (ppm) | | |
|---|---|---|---|---|---|---|---|---|---|
| | | | Resin | | Pigment | Resin | Pigment dispersion | Impregnated | Free |
| | | Type of pigment | Type | Amount (parts) | content (%) | content (%) | liquid (P + F) | amount (P) | amount (F) |
| Pigment dispersion liquid (before treatment) | I-1 | 1 | 1 | 37.5 | 15.0 | 7.5 | 4,600 | 4,550 | 50 |
| | I-2 | 2 | 1 | 37.5 | 15.0 | 7.5 | 4,600 | 4,550 | 50 |
| | I-3 | 3 | 1 | 37.5 | 15.0 | 7.5 | 4,600 | 4,550 | 50 |
| | I-4 | 4 | 1 | 37.5 | 15.0 | 7.5 | 4,600 | 4,550 | 50 |
| | I-5 | 5 | 1 | 37.5 | 15.0 | 7.5 | 4,600 | 4,550 | 50 |
| | I-6 | 6 | 1 | 37.5 | 15.0 | 7.5 | 4,600 | 4,550 | 50 |
| | I-7 | 7 | 1 | 37.5 | 15.0 | 7.5 | 4,600 | 4,550 | 50 |
| | I-8 | 8 | 1 | 37.5 | 15.0 | 7.5 | 4,600 | 4,550 | 50 |
| | I-9 | 9 | 1 | 37.5 | 15.0 | 7.5 | 4,600 | 4,550 | 50 |
| | I-10 | 10 | 1 | 37.5 | 15.0 | 7.5 | 4,600 | 4,550 | 50 |
| | I-11 | 11 | 1 | 37.5 | 15.0 | 7.5 | 4,600 | 4,550 | 50 |
| | I-12 | 12 | 1 | 37.5 | 15.0 | 7.5 | 4,600 | 4,550 | 50 |
| | I-13 | 13 | 1 | 37.5 | 15.0 | 7.5 | 4,600 | 4,550 | 50 |
| | I-14 | 14 | 1 | 37.5 | 15.0 | 7.5 | 4,600 | 4,550 | 50 |
| | I-15 | 15 | 1 | 37.5 | 15.0 | 7.5 | 4,600 | 4,550 | 50 |
| | I-16 | 16 | 1 | 37.5 | 15.0 | 7.5 | 4,600 | 4,550 | 50 |
| | I-17 | 17 | 1 | 37.5 | 15.0 | 7.5 | 4,600 | 4,550 | 50 |
| | I-18 | 18 | 1 | 37.5 | 15.0 | 7.5 | 4,600 | 4,550 | 50 |
| | I-19 | 19 | 1 | 37.5 | 15.0 | 7.5 | 4,600 | 4,550 | 50 |
| | I-20 | 20 | 1 | 37.5 | 15.0 | 7.5 | 4,600 | 4,550 | 50 |
| | I-21 | 21 | 1 | 37.5 | 15.0 | 7.5 | 4,600 | 4,550 | 50 |
| | I-22 | 22 | 1 | 37.5 | 15.0 | 7.5 | 4,600 | 4,550 | 50 |
| | I-23 | 23 | 1 | 37.5 | 15.0 | 7.5 | 4,600 | 4,550 | 50 |
| | I-24 | 24 | 1 | 37.5 | 15.0 | 7.5 | 2 | 2 | 0 |
| | I-25 | 25 | 1 | 37.5 | 15.0 | 7.5 | 1 | 1 | 0 |

TABLE 5-continued

Preparation conditions and properties of pigment dispersion liquid

|  | Type of pigment | Resin Type | Resin Amount (parts) | Properties Pigment content (%) | Resin content (%) | Mass ratio of amount of polysaccharide compound to amount of pigment (ppm) | | |
|---|---|---|---|---|---|---|---|---|
|  |  |  |  |  |  | Pigment dispersion liquid (P + F) | Impregnated amount (P) | Free amount (F) |
| I-26 | 1 | 2 | 37.5 | 15.0 | 7.5 | 4,600 | 4,550 | 50 |
| I-27 | 1 | 3 | 37.5 | 15.0 | 7.5 | 4,600 | 4,550 | 50 |
| I-28 | 1 | 4 | 37.5 | 15.0 | 7.5 | 4,600 | 4,550 | 50 |
| I-29 | 1 | 5 | 37.5 | 15.0 | 7.5 | 4,600 | 4,550 | 50 |
| I-30 | 1 | 6 | 37.5 | 15.0 | 7.5 | 4,600 | 4,550 | 50 |
| I-31 | 1 | 7 | 37.5 | 15.0 | 7.5 | 4,600 | 4,550 | 50 |
| I-32 | 1 | 8 | 37.5 | 15.0 | 7.5 | 4,600 | 4,550 | 50 |
| I-33 | 1 | 9 | 37.5 | 15.0 | 7.5 | 4,600 | 4,550 | 50 |
| I-34 | 1 | 10 | 37.5 | 15.0 | 7.5 | 4,600 | 4,550 | 50 |
| I-35 | 1 | 11 | 37.5 | 15.0 | 7.5 | 4,600 | 4,550 | 50 |
| I-36 | 1 | 12 | 37.5 | 15.0 | 7.5 | 4,600 | 4,550 | 50 |
| I-37 | 1 | 1 | 4.5 | 15.0 | 0.9 | 4,600 | 4,550 | 50 |
| I-38 | 1 | 1 | 5.0 | 15.0 | 1.0 | 4,600 | 4,550 | 50 |
| I-39 | 1 | 1 | 50.0 | 15.0 | 10.0 | 4,600 | 4,550 | 50 |
| I-40 | 1 | 1 | 55.0 | 15.0 | 11.0 | 4,600 | 4,550 | 50 |
| I-41 | 1 | 11 | 55.0 | 15.0 | 11.0 | 4,600 | 4,550 | 50 |
| I-42 | 26 | 1 | 22.5 | 15.0 | 4.5 | 0 | 0 | 0 |
| I-43 | 1 | — | 0 | 15.0 | 0.0 | 4,600 | 4,550 | 50 |

Adjustment of mass ratio of amount of polysaccharide compound with which pigment is impregnated to amount of pigment In accordance with the following procedure, the mass ratio of the amount of the polysaccharide compound with which the pigment is impregnated to the amount of the pigment was adjusted.

(A) Step of Releasing Polysaccharide Compound from Pigment

In a glass beaker having a volume of 2 L, 1 kg of a pigment dispersion liquid to be treated was placed, and an appropriate amount of an aqueous potassium hydroxide was added to the pigment dispersion liquid under stirring with a stirrer to adjust the pH to 12.0. The mixture was heated to a temperature shown in Table 6, then stirred for about 10 minutes, and cooled to normal temperature. By this operation, the polysaccharide compound was released from the pigment.

(B) Step of Removing Components Having Smaller Size than that of Pigment, of Components Derived from Polysaccharide Compound Released from Pigment The liquid after the step (A) was subjected to ultrafiltration through the ultrafiltration membrane shown below by a diafiltration system.

Ultrafiltration membrane
  Type: modified polyethersulfone hollow fiber module (trade name "MicroKros", manufactured by Spectrum Laboratories)
  Cutoff molecular weight: value shown in Table 6
  Membrane area: 1,600 cm$^2$
  Inner diameter: 0.5 mm (C) Step of Removing Alkali Component Used in Step (A)

After continuous repetition of the step (B), the pH of the liquid was adjusted to 9.0.

(D) Step of Removing Components Having Larger Size than that of Pigment, of Components Derived from Polysaccharide Compound Released from Pigment The liquid after the step (C) was centrifuged at 22,000 G for 10 minutes to remove coarse pigment particles and modified and gelated polysaccharide compounds.

(E) Step of Removing Modified or Gelated Polysaccharide Compounds

The liquid after the step (D) was filtered through a filter paper having a pore size of 0.45 μm (trade name "Ultipor GF-HV", manufactured by Pall) to remove modified and gelated polysaccharide compounds.

(F) Calculation of Mass Ratio of Amount of Polysaccharide Compound with which Pigment is Impregnated to Amount of Pigment The liquid after the step (E) (pigment dispersion liquid) was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound, and the mass ratio to the amount of the pigment (impregnated amount P (ppm)) was calculated.

Separately, the liquid after the step (E) (pigment dispersion liquid) was diluted 2,500 times (in terms of mass) by adding ion-exchanged water. The diluted liquid was subjected to ultrafiltration through the ultrafiltration membrane shown below by a diafiltration system to remove the polysaccharide compound present in a free state in the pigment dispersion liquid.

Ultrafiltration Membrane
  Type: modified polyethersulfone hollow fiber module (trade name "MicroKros", manufactured by Spectrum Laboratories)
  Cutoff molecular weight: 70 kDa
  Membrane area: 1,600 cm$^2$
  Inner diameter: 0.5 mm The pigment dispersion liquid after removal of the polysaccharide compound present in a free state was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound. Based on the difference from the impregnated amount P (ppm), the mass ratio of the amount of the polysaccharide compound present in a free state in the pigment dispersion liquid to the amount of the pigment (free amount F (ppm)) was calculated. From the above results, the value (P/(P+F))×100 was further calculated.

of ion-exchanged water as to give a total amount of 100.0% in place of 31.9% of ion-exchanged water. The viscosity of each ink was measured by means of an E-type viscometer (trade name "RE-80L", manufactured by TOKI Sangyo Co., Ltd.). Among the inks of examples, the ink which had a highest viscosity was the ink of Example 28 and its viscosity was 2.8 mPa·s, and among the inks of comparative examples, the ink which had a lowest viscosity was the ink of Comparative Example 3 and its viscosity was 3.5 mPa·s.

TABLE 6

Preparation conditions and characteristics of pigment dispersion liquid

| | Pigment dispersion liquid (before treatment) | | Preparation conditions | | Mass ratio of amount of polysaccharide compound to amount of pigment (ppm) | | | Properties | |
|---|---|---|---|---|---|---|---|---|---|
| | | | Temperature (° C.) | Cutoff molecular weight (kDa) | Impregnated amount P | Free amount F | (P/(P + F)) × 100 | Pigment content (%) | Resin content (%) |
| Pigment dispersion liquid (after treatment) | II-1 | I-1 | 80 | 70 | 3,000 | 0 | 100 | 15.0 | 4.5 |
| | II-2 | I-2 | 80 | 70 | 3,000 | 0 | 100 | 15.0 | 4.5 |
| | II-3 | I-3 | 80 | 70 | 3,000 | 0 | 100 | 15.0 | 4.5 |
| | II-4 | I-4 | 80 | 70 | 3,000 | 0 | 100 | 15.0 | 4.5 |
| | II-5 | I-5 | 80 | 70 | 3,000 | 0 | 100 | 15.0 | 4.5 |
| | II-6 | I-6 | 80 | 70 | 3,000 | 0 | 100 | 15.0 | 4.5 |
| | II-7 | I-7 | 80 | 70 | 3,000 | 0 | 100 | 15.0 | 4.5 |
| | II-8 | I-8 | 80 | 70 | 3,000 | 0 | 100 | 15.0 | 4.5 |
| | II-9 | I-9 | 80 | 70 | 3,000 | 0 | 100 | 15.0 | 4.5 |
| | II-10 | I-10 | 80 | 70 | 3,000 | 0 | 100 | 15.0 | 4.5 |
| | II-11 | I-11 | 80 | 70 | 3,000 | 0 | 100 | 15.0 | 4.5 |
| | II-12 | I-12 | 80 | 70 | 3,000 | 0 | 100 | 15.0 | 4.5 |
| | II-13 | I-13 | 80 | 70 | 3,000 | 0 | 100 | 15.0 | 4.5 |
| | II-14 | I-14 | 80 | 70 | 3,000 | 0 | 100 | 15.0 | 4.5 |
| | II-15 | I-15 | 80 | 70 | 3,000 | 0 | 100 | 15.0 | 4.5 |
| | II-16 | I-16 | 80 | 70 | 3,000 | 0 | 100 | 15.0 | 4.5 |
| | II-17 | I-17 | 80 | 70 | 3,000 | 0 | 100 | 15.0 | 4.5 |
| | II-18 | I-18 | 80 | 70 | 3,000 | 0 | 100 | 15.0 | 4.5 |
| | II-19 | I-19 | 80 | 70 | 3,000 | 0 | 100 | 15.0 | 4.5 |
| | II-20 | I-20 | 80 | 70 | 3,000 | 0 | 100 | 15.0 | 4.5 |
| | II-21 | I-21 | 80 | 70 | 3,000 | 0 | 100 | 15.0 | 4.5 |
| | II-22 | I-22 | 80 | 70 | 3,000 | 0 | 100 | 15.0 | 4.5 |
| | II-23 | I-23 | 80 | 70 | 3,000 | 0 | 100 | 15.0 | 4.5 |
| | II-24 | I-24 | 60 | 70 | 0.9 | 0 | 100 | 15.0 | 4.5 |
| | II-25 | I-25 | — | 70 | 1.0 | 0 | 100 | 15.0 | 4.5 |
| | II-26 | I-1 | 60 | 70 | 4,500 | 0 | 100 | 15.0 | 4.5 |
| | II-27 | I-1 | — | 10 | 4,500 | 3 | 100 | 15.0 | 7.5 |
| | II-28 | I-1 | 80 | 30 | 4,550 | 590 | 84 | 15.0 | 7.5 |
| | II-29 | I-1 | 80 | 50 | 3,000 | 330 | 90 | 15.0 | 6.5 |
| | II-30 | I-26 | 80 | 70 | 3,000 | 0 | 100 | 15.0 | 4.5 |
| | II-31 | I-27 | 80 | 70 | 3,000 | 0 | 100 | 15.0 | 4.5 |
| | II-32 | I-28 | 80 | 70 | 3,000 | 0 | 100 | 15.0 | 4.5 |
| | II-33 | I-29 | 80 | 70 | 3,000 | 0 | 100 | 15.0 | 4.5 |
| | II-34 | I-30 | 80 | 70 | 3,000 | 0 | 100 | 15.0 | 4.5 |
| | II-35 | I-31 | 80 | 70 | 3,000 | 0 | 100 | 15.0 | 4.5 |
| | II-36 | I-32 | 80 | 70 | 3,000 | 0 | 100 | 15.0 | 4.5 |
| | II-37 | I-33 | 80 | 70 | 3,000 | 0 | 100 | 15.0 | 4.5 |
| | II-38 | I-34 | 80 | 70 | 3,000 | 0 | 100 | 15.0 | 4.5 |
| | II-39 | I-35 | 80 | 70 | 3,000 | 0 | 100 | 15.0 | 4.5 |
| | II-40 | I-36 | 80 | 70 | 3,000 | 0 | 100 | 15.0 | 4.5 |
| | II-41 | I-37 | 80 | 70 | 3,000 | 0 | 100 | 15.0 | 0.6 |
| | II-42 | I-38 | 80 | 70 | 3,000 | 0 | 100 | 15.0 | 0.8 |
| | II-43 | I-39 | 80 | 70 | 3,000 | 0 | 100 | 15.0 | 7.5 |
| | II-44 | I-40 | 80 | 70 | 3,000 | 0 | 100 | 15.0 | 8.2 |
| | II-45 | I-41 | 80 | 70 | 3,000 | 0 | 100 | 15.0 | 8.2 |
| | II-46 | I-42 | — | — | 0 | 0 | — | 15.0 | 4.5 |
| | II-47 | I-43 | 80 | 70 | 3,000 | 0 | 100 | 15.0 | 0.0 |

Preparation of Ink

Components (unit: %) shown below were mixed and thoroughly stirred, and the resulting mixtures were subjected to pressure filtration through a microfilter with a pore size of 2.5 μm (manufactured by Fujifilm Corporation), giving inks. Separately, an ink of Comparative Example 2 was prepared by using 0.036% of xanthan gum having a weight-average molecular weight of 2,000,000 and such a residual amount A pigment dispersion liquid shown in Table 7: 53.0%
Glycerol: 5.0%
Triethylene glycol: 10.0%
Acetylenol E100: 0.1%
Ion-exchanged water: 31.9%

Evaluation

Each prepared ink was filled in an ink cartridge, and the ink cartridge was installed in an ink jet recording apparatus equipped with a recording head that ejects an ink by thermal energy. In the examples, the solid image recorded under conditions in which 28 ng of an ink is applied to a unit area of 1/600 inch×1/600 inch is defined as "a recording duty of 100%". In the present invention, "A" and "B" were regarded as an acceptable level, and "C" was regarded as an unacceptable level based on the following criteria of each item. The evaluation results are shown in right columns in Table 7.

Optical Density

An ink jet recording apparatus (trade name "PIXUS MG5230", manufactured by Canon) was used to record an image on a recording medium (plain paper, trade name "PB PAPER GF-500", manufactured by Canon) under the conditions shown below. First, a 5 cm×5 cm solid image was recorded at a recording duty of 100%, then the ejection was stopped for 2 seconds, and a ruled line having a width of 3 dots was recorded without recovery operation (preliminary ejection and aspiration recovery), giving a recorded product. Then, a spectrophotometer (trade name "Spectrolino", manufactured by Gretag Macbeth) was used to determine the optical density of the solid image on the recorded product under conditions of a D50 light source and a field of 2°, and the optical density of the image was evaluated based on the following criteria.

A: The optical density was 1.40 or more.

B: The optical density was 1.35 or more to less than 1.40.

C: The optical density was less than 1.35.

Suppression of Irregular Ejection

The ruled line on the recorded product used in the evaluation of "optical density" was visually observed, and the suppression of irregular ejection was evaluated based on the following criteria.

A: The dot adhesion positions were not displaced, and a straight ruled line was observed.

B: The dot adhesion positions were displaced by about half a dot, but the ruled line was not distorted.

C: The dot adhesion positions were displaced by about a dot, or the ruled line was partly distorted or faded due to ejection failure of an ink.

Abrasion Resistance

An ink jet recording apparatus (trade name "PIXUS Pro 9500", manufactured by Canon) was used to record a 10 cm×15 cm solid image at a recording duty of 100% on a recording medium (plain paper, trade name "PB PAPER GF-500", manufactured by Canon) to give a recorded product. To a color fastness rubbing tester (manufactured by Yasuda Seiki Seisakusho), the above recording medium was fixed for a friction block, and the solid image area on the recorded product was rubbed with the friction block predetermined times at a load of 1.96 N. Then, the solid image was visually observed to evaluate the abrasion resistance of the image based on the following criteria.

A: Scratches were observed on an image after 20 strokes of rubbing, but no scratch was observed on the image after 10 strokes of rubbing.

B: Scratches were observed on an image after 10 strokes of rubbing, but no scratch was observed on the image after 5 strokes of rubbing.

C: Scratches were observed on an image after 5 strokes of rubbing.

TABLE 7

Formulation of ink, evaluation result

| | | Type of pigment dispersion liquid | Optical density | Irregular ejection suppression | Abrasion resistance |
|---|---|---|---|---|---|
| Example | 1 | II-1 | A | A | A |
| | 2 | II-2 | A | A | A |
| | 3 | II-3 | A | A | A |
| | 4 | II-4 | A | A | A |
| | 5 | II-5 | A | A | A |
| | 6 | II-6 | A | A | A |
| | 7 | II-7 | A | A | A |
| | 8 | II-8 | A | A | A |
| | 9 | II-9 | A | A | A |
| | 10 | II-10 | A | A | A |
| | 11 | II-11 | A | A | A |
| | 12 | II-12 | A | A | A |
| | 13 | II-13 | A | A | A |
| | 14 | II-14 | A | A | A |
| | 15 | II-15 | A | A | A |
| | 16 | II-16 | A | A | A |
| | 17 | II-17 | A | A | A |
| | 18 | II-18 | A | A | A |
| | 19 | II-19 | A | A | A |
| | 20 | II-20 | A | A | A |
| | 21 | II-21 | A | A | A |
| | 22 | II-22 | A | B | A |
| | 23 | II-23 | A | B | A |
| | 24 | II-24 | B | A | A |
| | 25 | II-25 | A | A | A |
| | 26 | II-26 | A | A | A |
| | 27 | II-27 | A | B | A |
| | 28 | II-28 | A | B | A |
| | 29 | II-29 | A | A | A |
| | 30 | II-30 | A | A | A |
| | 31 | II-31 | A | A | A |
| | 32 | II-32 | A | A | A |
| | 33 | II-33 | A | A | A |
| | 34 | II-34 | A | A | A |
| | 35 | II-35 | A | A | A |
| | 36 | II-36 | A | A | A |
| | 37 | II-37 | A | A | A |
| | 38 | II-38 | A | A | A |
| | 39 | II-39 | A | B | A |
| | 40 | II-40 | A | B | A |
| | 41 | II-41 | A | B | A |
| | 42 | II-42 | A | A | A |
| | 43 | II-43 | A | A | A |
| | 44 | II-44 | B | A | A |
| | 45 | II-45 | B | B | A |
| Comparative Example | 1 | II-46 | C | A | A |
| | 2 | II-46 | A | C | A |
| | 3 | II-47 | A | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101647, filed May 20, 2016, and Japanese Patent Application No. 2017-085086, filed Apr. 24, 2017, which are hereby incorporated by reference herein in their entirety.

What is claimed is:

1. An aqueous ink for ink jet, the aqueous ink comprising:
a pigment; and
a resin for dispersing the pigment,
wherein the pigment is impregnated with a compound having a structure in which at least two structures each represented by General Formula (1) are bonded by a glycoside bond:

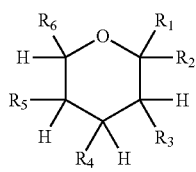

(1)

wherein, in General Formula (1), each of $R_1$ to $R_6$ is independently a hydrogen atom, a methyl group, a phosphonic acid group, $-(CH_2)_x-OH$, $-(OCH(CH_3))_y-COOH$, $-NH(COCH_2)_z-H$, $-OCOCH_2CH(OCOCH_2(OH)C_{11}H_{22}CH_3)C_{10}H_{20}CH_3$, or $-NHCOCH_2CH(OC_{11}H_{22}CH_3)C_{10}H_{20}CH_3$, and at least one of $R_1$ and $R_2$ is a hydroxy group, and each of x, y, and z is independently a number from 0 or more to 6 or less, and wherein the compound has a weight-average molecular weight of 20,000 or more to 2,200,000 or less.

2. The aqueous ink according to claim 1, wherein an amount of the compound with which the pigment is impregnated is 1 ppm or more to 4,500 ppm or less, in terms of mass ratio, to an amount of the pigment.

3. The aqueous ink according to claim 1, wherein a content (ppm) of the compound with which the pigment is impregnated, in terms of mass ratio, to a total content (ppm) of the compound in the ink is 90% or more.

4. The aqueous ink according to claim 1, wherein the resin has (i) a unit having an aromatic group and (ii) a unit represented by General Formula (2):

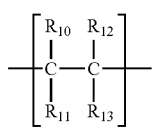

(2)

wherein, in General Formula (2), each of $R_{10}$ to $R_{13}$ is independently a hydrogen atom, an alkyl group having 1 to 8 carbon atoms, a cycloalkyl group having 4 to 8 carbon atoms, a carboxylic acid group, or an alkyl group having 1 to 5 carbon atoms and being substituted with a carboxylic acid group, at least one of $R_{10}$ to $R_{13}$ is a carboxylic acid group or an alkyl group having 1 to 5 carbon atoms and being substituted with a carboxylic acid group, and the rest of $R_{10}$ to $R_{13}$ are a hydrogen atom, an alkyl group having 1 to 8 carbon atoms, or a cycloalkyl group having 4 to 8 carbon atoms.

5. The aqueous ink according to claim 1, wherein a content (% by mass) of the resin, in terms of mass ratio, to a content (% by mass) of the pigment is 0.05 times or more to 0.50 times or less.

6. An ink cartridge comprising:
an ink; and
an ink storage portion storing the ink,
wherein the ink comprises the aqueous ink according to claim 1.

7. An ink jet recording method comprising ejecting an ink from an ink jet recording head to record an image on a recording medium,
wherein the ink comprises the aqueous ink according to claim 1.

8. The aqueous ink according to claim 1, wherein the compound having the structure represented by General Formula (1) is at least one compound selected from the group consisting of rhamnose, glucose, galactose, mannose, glucuronic acid, xylose, glucosamine, N-acetylglucosamine, N-acetylgalactosamine, neuraminic acid, N-acetylneuraminic acid, muramic acid, N-acetylmuramic acid, and lipid A.

9. The aqueous ink according to claim 1, wherein the compound comprises at least one polysaccharide compound selected from the group consisting of dextran, arabinoxylan, xanthan gum, guar gum, hyaluronic acid, gellan gum, ganglioside, peptidoglycan, and lipopolysaccharide.

10. The aqueous ink according to claim 1, wherein the content (% by mass) of the pigment in the ink is 0.1% by mass or more to 15.0% by mass or less based on the total mass of the ink.

11. The aqueous ink according to claim 1, wherein the content (% by mass) of the resin in the ink is 0.1% by mass or more to 5.0% by mass or less based on the total mass of the ink.

12. The aqueous ink according to claim 1, wherein the compound comprises a polysaccharide compound, and the content (ppm) of the polysaccharide compound present in a free state in the ink is 25 ppm or less based on the total mass of the ink, in which the polysaccharide compound present in a free state means that the polysaccharide compound is not incorporated into the pigment.

* * * * *